(12) United States Patent
Kim et al.

(10) Patent No.: US 11,769,492 B2
(45) Date of Patent: Sep. 26, 2023

(54) VOICE CONVERSATION ANALYSIS METHOD AND APPARATUS USING ARTIFICIAL INTELLIGENCE

(71) Applicant: Samsung Electronics Co., Ltd., Suwon-si (KR)

(72) Inventors: Changhan Kim, Suwon-si (KR); Bowon Kim, Suwon-si (KR); Jinsuk Lee, Suwon-si (KR); Hyeontaek Lim, Suwon-si (KR); Yangwook Kim, Suwon-si (KR); Guiwon Seo, Suwon-si (KR); Jonghwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 17/040,746

(22) PCT Filed: Mar. 26, 2019

(86) PCT No.: PCT/KR2019/003508
§ 371 (c)(1),
(2) Date: Sep. 23, 2020

(87) PCT Pub. No.: WO2019/194451
PCT Pub. Date: Oct. 10, 2019

(65) Prior Publication Data
US 2021/0012766 A1 Jan. 14, 2021

(30) Foreign Application Priority Data

Apr. 6, 2018 (KR) .................... 10-2018-0040374

(51) Int. Cl.
*G10L 15/16* (2006.01)
(52) U.S. Cl.
CPC ................... *G10L 15/16* (2013.01)

(58) Field of Classification Search
CPC ...................................................... G10L 15/16
See application file for complete search history.

(56) References Cited

U.S. PATENT DOCUMENTS

| 4,716,593 | A | * | 12/1987 | Hirai | .................. | G06V 30/2504 |
| | | | | | | 704/247 |
| 6,510,417 | B1 | * | 1/2003 | Woods | ................ | H04M 3/4938 |
| | | | | | | 704/E15.045 |

(Continued)

FOREIGN PATENT DOCUMENTS

| JP | 2014170132 A | 9/2014 |
| JP | 5644137 B2 | 12/2014 |

(Continued)

*Primary Examiner* — Bhavesh M Mehta
*Assistant Examiner* — Edward Tracy, Jr.
(74) *Attorney, Agent, or Firm* — Jefferson IP Law, LLP

(57) ABSTRACT

The present invention relates to a voice conversation analysis apparatus and a method therefor and, more specifically, to: a voice conversation analysis apparatus categorizing voices generated during a voice conversation so as to predict required functions and further analyzing the voices so as to provide proper functions; and a method therefor. In addition, disclosed are: an artificial intelligence (AI) system for simulating the functions of recognition, decision-making, and the like of the human brain by using a machine learning algorithm; and an application thereof. According to one embodiment, disclosed in an electronic device control method for performing an operation through a suitable operating mode by using an AI learning model so as to analyze a voice conversation, comprising the steps of: receiving a voice and acquiring information on the voice; acquiring category information on the voice on the basis of the information on the voice so as to determine at least one operating mode corresponding to the category information;

(Continued)

and performing an operation related to the operating mode by using an AI model corresponding to the determined operating mode.

11 Claims, 21 Drawing Sheets

(56) References Cited

U.S. PATENT DOCUMENTS

| | | | |
|---|---|---|---|
| 8,910,305 B1* | 12/2014 | Rai | G06F 21/83 |
| | | | 726/28 |
| 9,264,869 B2 | 2/2016 | Jeong | |
| 9,942,752 B1* | 4/2018 | Marimuthu | H04W 12/041 |
| 10,074,384 B2 | 9/2018 | Hayakawa | |
| 10,244,109 B2* | 3/2019 | Bender | H04L 67/42 |
| 2008/0319743 A1* | 12/2008 | Faisman | G10L 15/065 |
| | | | 704/235 |
| 2013/0029308 A1* | 1/2013 | Graesser | G09B 7/00 |
| | | | 434/327 |
| 2014/0067375 A1 | 3/2014 | Wooters | |
| 2014/0272821 A1* | 9/2014 | Pitschel | G09B 19/06 |
| | | | 434/157 |
| 2015/0256930 A1* | 9/2015 | Yamakawa | H04K 3/43 |
| | | | 704/205 |
| 2017/0230497 A1* | 8/2017 | Kim | G10L 15/22 |
| 2017/0366668 A1* | 12/2017 | Kolbegger | G10L 25/51 |
| 2019/0096396 A1* | 3/2019 | Jiang | G10L 15/02 |

FOREIGN PATENT DOCUMENTS

| | | |
|---|---|---|
| JP | 5685488 B2 | 3/2015 |
| KR | 10-2013-0084856 A | 7/2013 |
| KR | 10-1328389 B1 | 11/2013 |
| KR | 10-2015-0114973 A | 10/2015 |
| KR | 10-2016-0059640 A | 5/2016 |
| KR | 10-2016-0149488 A | 12/2016 |
| KR | 10-1779696 B1 | 9/2017 |

* cited by examiner

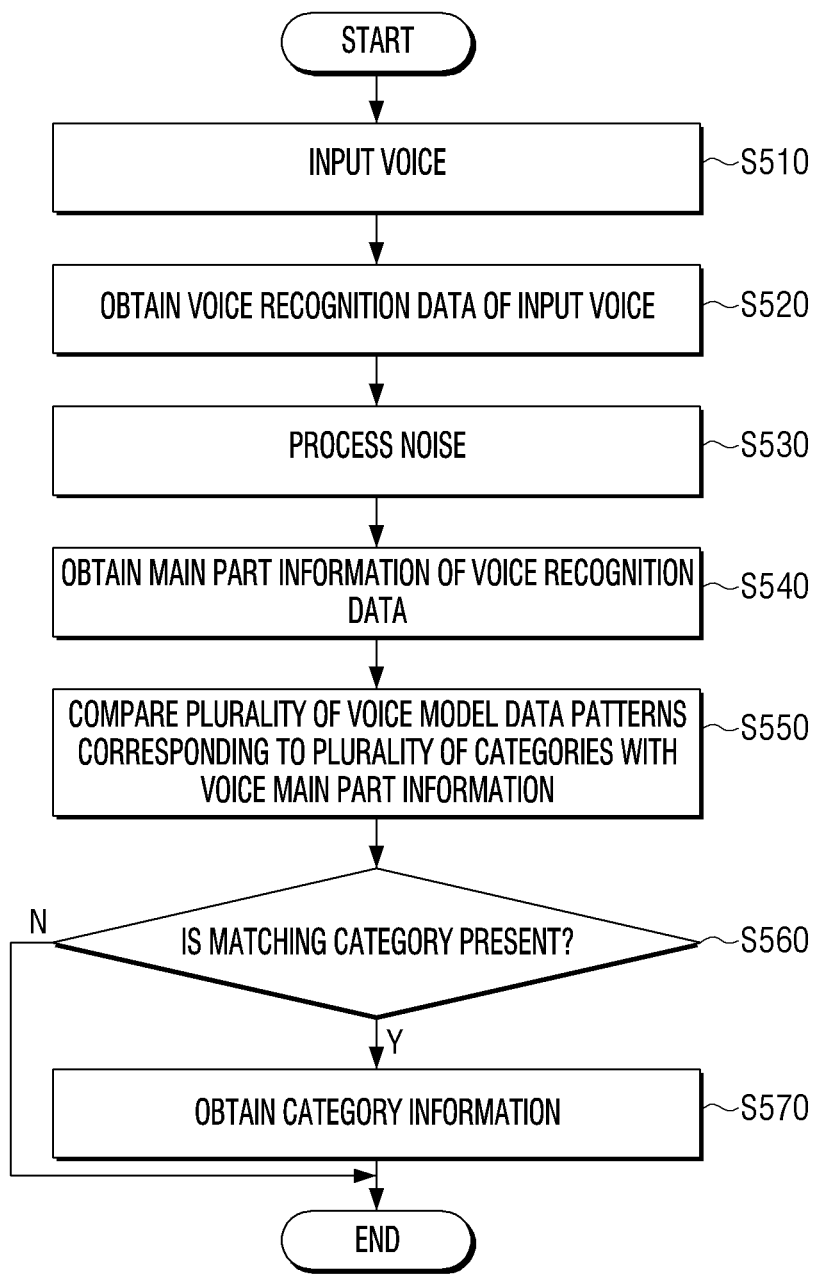

VOICE CONVERSATION ANALYSIS METHOD AND APPARATUS USING ARTIFICIAL INTELLIGENCE

TECHNICAL FIELD

The disclosure relates to a voice conversation analysis apparatus and a method thereof, and more specifically to a voice conversation analysis apparatus which predicts required functions by categorizing voice generated from voice conversations, and provides appropriate functions by analyzing the voice and a method thereof.

In addition, the disclosure relates to an artificial intelligence (AI) system simulating functions such as recognition, determination, and the like of a human brain by utilizing a machine learning algorithm and its application.

BACKGROUND ART

In recent years, artificial intelligence systems realizing intelligence of a human level are being used in a variety of fields. An artificial intelligence system may be a system in which a machine learns and performs determination on its own thereby becoming smart, unlike existing rule-based smart systems. Because the artificial intelligence system exhibits improved recognition rate and a more accurate understanding of user preference the more it is used, existing rule based smart systems are gradually being replaced with deep learning based artificial intelligence systems.

The artificial intelligence technology includes machine learning (e.g., deep learning) and element technologies utilizing machine learning.

The machine learning may be an algorithm technology that classifies/learns features of input data on its own, and element technology may be technology that simulates functions such as recognition and determination of a human brain by utilizing machine learning algorithms such as deep learning. The artificial intelligence (AI) technology may be applicable to technical fields such as linguistic understanding, visual understanding, inference/prediction, knowledge representation, and motion control.

The various fields to which artificial intelligence technology may be applied is described in the following. Linguistic understanding is a technique in which language/character of humans is recognized and applied/processed and includes natural language processing, machine translation, dialog system, question and answer, speech recognition/synthesis, and the like. Visual understanding is a technique that processes things as recognized visually by a human, and includes object recognition, object tracking, image search, human recognition, scene understanding, space understanding, image enhancement, and the like. Inference prediction is a technique that determines information by logical inference and prediction, and includes knowledge/likelihood based inference, optimization prediction, preference based planning, recommendation and the like. Knowledge representation is a technique that automatically processes experience information of humans to knowledge data and includes knowledge construction (generating/classifying data), knowledge management (utilizing data), and the like. Motion control is a technique for controlling the autonomous driving of a vehicle and the movement of a robot, and includes movement control (navigation, collision, driving), manipulation control (behavior control), and the like.

Recently, electronic apparatuses capable of performing user voice analysis and performing corresponding operations thereof have been developed. For example, when a call from an unregistered number or a colleague whose number is not registered arrives, a determination of whether the call is a voice phishing call may be made.

However, because the above-described electronic apparatuses perform conversation analysis considering all possible cases, the amount of unnecessary computation increases and the rate of conversation analysis is slow. In addition, because a determination may be made only when a subject of determination is included in an existing database, there may be cases of the analysis being inaccurate.

DISCLOSURE

Technical Problem

The disclosure provides a voice conversation analysis apparatus and a method thereof that increases computational speed by extracting only a minimum feature for conversation analysis, and performs an accurate operation in an operation mode through an artificial intelligence model which corresponds to the operation mode.

Technical Solution

According to an embodiment, a control method of an electronic apparatus for performing an operation through an appropriate operation mode by analyzing a voice conversation using an artificial intelligence learning model includes receiving input of voice, obtaining information on the voice, identifying at least one operation mode corresponding to a category information by obtaining the category information of the voice based on information on the voice, and performing an operation related to the operation mode by using an artificial intelligence model corresponding to the identified operation mode.

In the control method according to an embodiment, the category may include a voice phishing category, an advertisement category, a family category, and acquaintance category, and the operation mode may include a voice phishing prevention mode, an advertisement filter mode, a conversation analysis mode, a speech practice mode, an English call mode, and an automatic mode.

The control method according to an embodiment may further include, based on the determined mode being a conversation analysis mode, obtaining at least one information of a keyword information and an emotion information on a voice by inputting the voice to the artificial intelligence model corresponding to the determined operation mode, and based on a pre-set event occurring, outputting the obtained information through a function of the conversation analysis mode, and the function of the conversation analysis mode may include displaying an interest keyword frequency included within a pre-set period, providing information links related to the keyword, and displaying a frequency of negative conversation within a pre-set period.

The control method according to an embodiment may further include, based on the determined mode being a voice phishing prevention mode, obtaining a control instruction by inputting the voice to the artificial intelligence model corresponding to the determined voice phishing prevention mode, and performing at least one function of the voice phishing prevention mode based on the control instruction, and the function of the voice phishing prevention mode may include displaying a report button, limiting financial applications, and a voice phishing alarm.

In the control method according to an embodiment, the obtaining the control instruction may further include obtaining content in which the voice is textualized and obtaining voice feature information from the voice, and the control instruction is obtained by inputting the content and the feature information to the artificial intelligence model corresponding to the determined operation model, and the feature information may include shaking of voice, tone, and number of phonemes per unit time.

The control method according to an embodiment may further include, based on the determined mode being a speech practice mode, obtaining at least one information of a grammar information on the voice, a pronunciation information, and an intonation information by inputting the voice to the artificial intelligence mode corresponding to the determined operation mode, and based on a pre-set event occurring, outputting the obtained information through a function of the speech practice mode, and the function of the speech practice mode may include displaying frequency in pronunciation error within a pre-set period, and displaying grammar error within a pre-set period.

In the control method according to an embodiment, the category information may include obtaining a category information corresponding to a voice model data pattern by determining the voice model data pattern which matches the information on the voice in a database including a plurality of voice model data patterns corresponding to a plurality of categories, and the voice model data pattern may include a mechanical sound determination model, a gender classification model, an age classification model, and a language classification model.

The control method according to an embodiment may include, based on a voice model data pattern matching the information on the voice not being present in the database, determining the category as an uncategorized category, and determining the operation mode to a pre-set basic mode.

The control method according to an embodiment may further include, based on a the basic mode being an automatic mode, determining an operation mode corresponding to an output information based on the obtained output information by inputting the voice to a plurality of artificial intelligence models corresponding to a plurality of operation modes, and determining category information corresponding to the operation mode and updating a voice model data pattern corresponding to the category information based on information on the voice.

According to an embodiment, an electronic apparatus for analyzing voice using an artificial intelligence model includes a voice receiver, a voice main part obtainer, and a processor, and the processor is configured to control the voice receiver to receive input of a voice, control the voice main part obtainer to obtain information on the received voice, determine at least one operation mode corresponding to a category information by obtaining the category information on the voice based on information on the voice, and perform an operation related to the operation mode by using an artificial intelligence model corresponding to the determined operation mode. The category may include a voice phishing category, an advertisement category, a family category, and an acquaintance category, and the operation mode may include a voice phishing prevention mode, an advertisement filter mode, a conversation analysis mode, a speech practice mode, an English call mode, and an automatic mode.

The electronic apparatus for analyzing voice using an artificial intelligence model may further include a communicator, and the processor may be configured to control the communicator to receive at least one information of a keyword information and an emotion information on the voice output from the artificial intelligence model corresponding to the determined operation mode, and based on a pre-set event occurring, output the received information through a function of the conversation analysis mode, and the function of the conversation analysis mode may include displaying a frequency of interest keyword included within a pre-set period, providing information links related to the keyword, and displaying a frequency of negative conversation within a pre-set period.

The electronic apparatus for analyzing voice using an artificial intelligence model may further include a communicator, and based on the determined mode being a voice phishing prevention mode, the processor may be configured to control the communicator to receive an output control instruction from an external server by inputting the voice to the artificial intelligence model corresponding to the determined voice phishing prevention mode, and perform at least one function of the voice phishing prevention mode based on the control instruction, and the function of the voice phishing prevention mode may include displaying a report button, limiting financial applications, and a voice phishing alarm.

The electronic apparatus for analyzing voice using an artificial intelligence model may further include a voice text converter, a voice feature obtainer, and a communicator, and the processor may be configured to control the voice text converter to obtain content by textualizing the voice, control the voice feature obtainer to obtain voice feature information from the voice, and control the communicator to receive to output control instruction from the external server by inputting the content and the feature information to the artificial intelligence model corresponding to the determined operation mode, and the feature information may include shaking of voice, tone, and number of phonemes per unit time.

The electronic apparatus for analyzing voice using an artificial intelligence model may further include a communicator, and based on the determined mode being a speech practice mode, control the communicator to receive at least one information of a grammar information on the output voice, pronunciation information, and intonation information by inputting the voice to the artificial intelligence mode corresponding to the determined operation mode, and based on a pre-set event occurring, outputting the received information through a function of the speech practice mode, and the function of the speech practice mode may include displaying frequency in pronunciation error within a pre-set period, and displaying grammar error within a pre-set period.

In electronic apparatus for analyzing voice using an artificial intelligence model, the processor may be configured to identify a voice model data pattern matching the information on the voice in a database including a plurality of voice model data patterns corresponding to a plurality of categories, and obtain a category information corresponding to the voice model data pattern, and the voice model data pattern may include a mechanical sound determination model, a gender classification model, an age classification model, and a language classification model.

The electronic apparatus for analyzing voice using an artificial intelligence model may, based on a voice model data pattern matching the information on the voice not being present in the database, the processor may identify the category as an uncategorized category, and identify the operation mode as a pre-set basic mode.

The electronic apparatus for analyzing voice using an artificial intelligence model may further include a communicator, and based on the basic mode being an automatic mode, the processor may be configured to control the communicator to receive output information by inputting the voice to a plurality of artificial intelligence models corresponding to a plurality of operation modes, identify an operation mode corresponding to the output information based on the output information, identify a category information corresponding to the operation mode, and update the voice model data pattern corresponding to the category information based on the information on the voice.

Effect of Invention

The disclosure relates to first performing speaker categorizing of determining a primary scope by extracting a minimum feature required in speaker recognition from voices collected, and identifying a suitable conversation analysis method thereof to proceed with conversation analysis. In addition, because a result data of the data analysis is utilized in a deep learning training modeling necessary in categorizing and conversation analysis, the conversation analysis may be performed much quickly and accurately than conventional technology and may be applicable to various operation modes.

DESCRIPTION OF DRAWINGS

FIGS. 5A and 5B are flowcharts illustrating a method of obtaining category information on a voice by an electronic apparatus according to an embodiment of the disclosure;

DETAILED DESCRIPTION OF EXEMPLARY EMBODIMENTS

Figure 1:
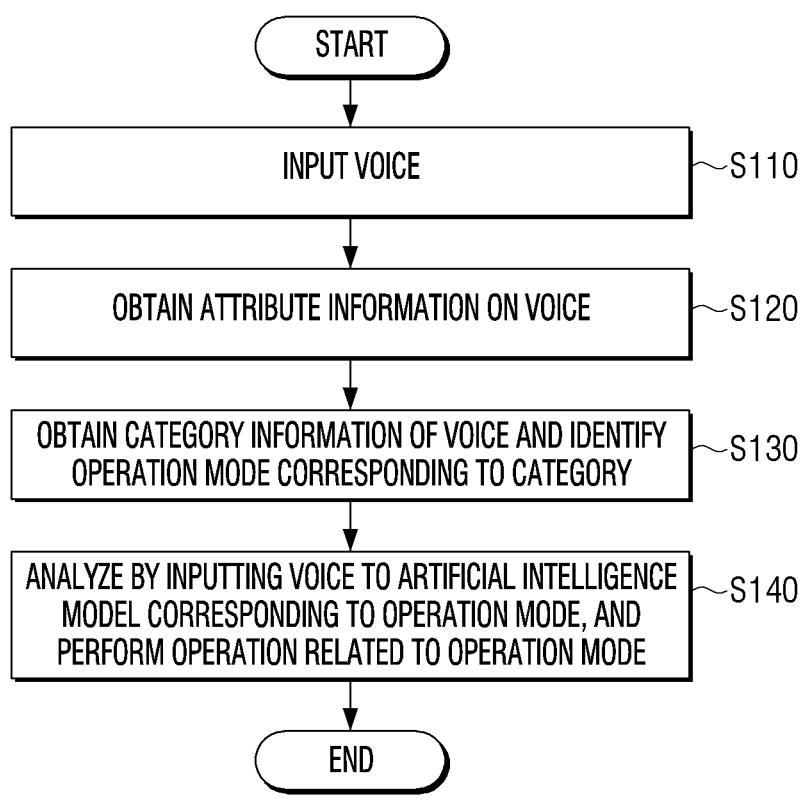
FIG. 1 is a diagram illustrating an electronic system according to an embodiment of the disclosure.

Various embodiments of the disclosure will be described herein with reference to the accompanying drawings. However, it should be noted that the various embodiments are not for limiting the scope of the disclosure to a specific embodiment, but should be interpreted to include all modifications, equivalents and/or alternatives of the embodiments. In describing the embodiments, like reference numerals may be used to refer to like elements.

Expressions such as "first" and "second" as used herein may modify various elements, regardless of order and/or importance, and used to distinguish one element from another, without limiting the corresponding elements. For example, a first user device and a second user device, may represent user devices different from one another, regardless of order and/or importance. For example, without exceeding the scope of protection described herein, a first element may be designated as a second element, and likewise, the second element may also be designated as the first element.

When a certain element (e.g., first element) is indicated as being "(operatively or communicatively) coupled with/to" or "connected to" another element (e.g., second element), it is to be understood as the certain element being directly coupled with/to the other element or as being coupled through still another element (e.g., third element). On the other hand, when a certain element (e.g., first element) is indicated as "directly coupled with/to" or "connected to" another element (e.g., second element), it is to be understood as still another element (e.g., third element) not being present between the certain element and the other element.

The terms used herein have merely been used to describe a specific embodiment, and not to limit the scope of another embodiment. A singular expression includes a plural expression, unless otherwise specified. The terms used in the disclosure, including technical or scientific terms, may have the same meaning as the terms generally understood by those of ordinary skill in the related field of art. Of the terms used herein, the terms which are defined in a typical dictionary may be interpreted to meanings identical or similar to the contextual meanings thereof in the related art. Unless clearly defined otherwise, the terms may not be interpreted to ideal or excessively formal meanings. In some cases, even if the term is defined in the disclosure, the terms may not be interpreted to exclude the embodiments of the disclosure.

An electronic apparatus in accordance with various embodiments of the disclosure may include, for example, smartphones, tablet personal computers (PCs), mobile phones, video telephones, electronic book readers, desktop PCs, laptop PCs, netbook computers, workstations, servers, a personal digital assistance (PDA), a portable multimedia player (PMP), an MP3 player, a medical device, a camera, or a wearable device. The wearable device may include any one or any combination of the accessory type (e.g., as a watch, a ring, a bracelet, an anklet, a necklace, a pair of glasses, a contact lens or a head-mounted-device (HMD)); a fabric or a garment-embedded type (e.g., an electronic clothing), a skin-attached type (e.g., a skin pad or a tattoo); or a bio-implantable circuit. In some embodiments, the electronic apparatus may include, for example, and without limitation, at least one of, a television, a digital video disk (DVD) player, an audio, a refrigerator, a cleaner, an oven, a microwave, a washing machine, an air purifier, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, an electronic frame, or the like In the disclosure, the term "user" may refer to a person using an electronic device or a device (e.g., artificial intelligence electronic device) using an electronic device.

Various embodiments of the disclosure will be described in detail below using the accompanying drawings. FIG. 1 is a diagram illustrating an embodiment performing a function through an operation mode corresponding to a category by identifying a category of voice based on information on a received voice according to an embodiment of the disclosure.

The electronic apparatus may receive input of voice S110. The received voice may include a voice uttered by an external speaker, a voice uttered from the user, a voice uttered from a conversation between external speakers, and a voice uttered in a conversation between an external speaker and the user. In addition, the electronic device may receive input of a voice by executing a personal assistant program, which is executed based on a pre-set user input. However, this is merely an embodiment, and may be realized as a user voice including pre-set words (e.g., Bixby), a user input selecting a button provided on a pre-set area of the electronic apparatus, and the like. This is also merely one embodiment, and the electronic apparatus may receive input of a conversation generated in a surrounding to the electronic apparatus even through there is no particular user input and a conversation through an electronic apparatus at all times.

The electronic apparatus may, based on receiving input of voice, obtain information on the voice S120. The information on the voice may include various information such as mechanical sound/voice recording determination information, gender information of speaker, age group information of speaker, and native language use determination information, but this is merely one embodiment, and the information on the voice may include various information on the speaker.

The electronic apparatus may obtain a category information on voice based on information on voice, and identify an operation mode corresponding to the obtained category information S130. That is, the electronic apparatus may obtain at least one category information based on information on the obtained voice. The category on the voice may include a voice phishing category, an advertisement category, a family category, and an acquaintance category, but this is merely one embodiment, and may include various categories such as an uncategorized category in addition thereto. Further, the category type may be set at the time of shipping a product, or may be designated by the user separately.

The electronic device may identify at least one operation mode corresponding to the obtained category information. The operation mode may include a voice phishing prevention mode, an advertisement filter mode, a conversation analysis mode, a speech practice mode, and a basic mode, but this is merely one embodiment, and other various operation modes may be included in addition thereto.

The electronic apparatus may, based on identifying an operation mode, analyze by inputting the voice to the artificial intelligence model corresponding to the identified operation mode, and perform one operation related to the identified operation mode based on the analysis result S140. The artificial intelligence model corresponding to the operation mode may be an algorithm trained to perform a function of each operation mode. For example, the electronic apparatus may input the voice to a voice phishing determining artificial intelligence model corresponding to the voice phishing prevention mode, and if the input voice is identified as voice phishing, the artificial intelligence model may output a control instruction for performing one function (e.g., displaying a report button, limiting financial applications, a voice phishing alarm, etc.) of the voice phishing prevention mode.

The above-described learned model, as a learned determination model based on artificial intelligence, may be, for example, a model based on a neural network. The object determination model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. In addition, the object determination model may include, for example, a neural network model or a deep learning model developed from a neural network model. In the deep learning model, a plurality of network nodes are located at different depths (or layers), and may transmit and receive data according to a convolution connection relationship. Examples of object determination model may include, but are not limited to, deep neural network (DNN), recurrent neural network (RNN), and bidirectional recurrent deep neural network (BRDNN).

In addition, the electronic apparatus may determine an operation mode as described above, and may use a personal assistant program, which is an artificial intelligence agent to perform the function corresponding to the operation mode. The personal assistant program may be dedicated program for providing an artificial intelligence (AI) based service, and may be executed by a conventional generic-purpose processor (e.g., central processing unit (CPU)) or a separate AI dedicated processor (e.g., graphics processing unit (GPU), etc.).

When a pre-set user input (e.g., a touch of an icon corresponding to the personal assistant program, user voice including a pre-set word, etc.) is input or a button (e.g., button for executing the artificial intelligence agent) provided in the electronic apparatus is pressed, the artificial intelligence agent may be operated. The artificial intelligence agent may determine the category information corresponding to the voice and the operation mode based on a text information corresponding to the input voice and a chatting history information, and transmit the text information and the chatting history information to the artificial intelligence model corresponding to the determined operation mode. The artificial intelligence agent may also display an analysis result through the artificial intelligence model.

When a pre-set user input is detected on the screen or the button (e.g., the button for executing the artificial intelligence agent) provided on the electronic apparatus is pressed, the artificial intelligence agent may be operated. Alternatively, the artificial intelligence agent may be in a state in which the pre-set user input has been detected or the button provided on the electronic apparatus is in a pre-executed state prior to the being selected. In this case, if a pre-set user input is detected or the button provided on the electronic apparatus has been selected, the artificial intelligence agent of the electronic apparatus may determine the category corresponding to the input voice and the operation mode. In addition, the artificial intelligence agent may be in a state in which a pre-set user input is detected or the button provided on the electronic device is in a standby state prior to being selected. The standby state refers to a state of detecting a predefined user input being received to control an operation start of the artificial intelligence agent. Based on detecting the pre-set user input while the artificial intelligence agent is in the standby state or the button provided on the electronic apparatus being selected, the electronic apparatus may operate the artificial intelligence agent, and determine the category of the input voice and the operation mode.

Figure 2:
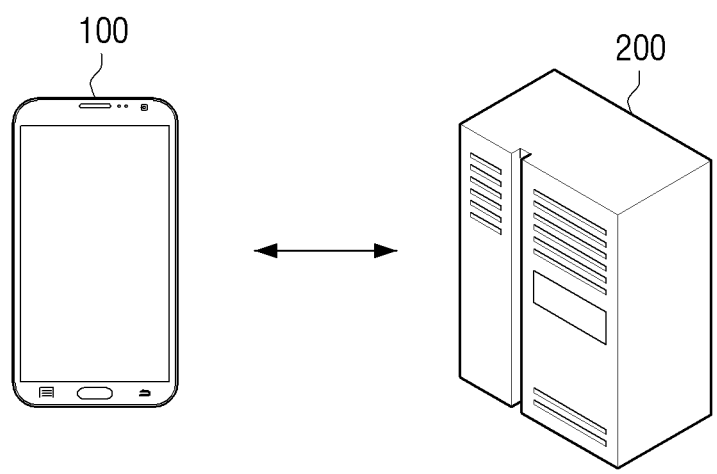
FIG. 2 is a diagram briefly illustrating a system including an electronic apparatus and an external server according to an embodiment of the disclosure.

FIG. 2 is a diagram briefly illustrating a system including an electronic apparatus and an external server according to an embodiment of the disclosure. As illustrated in FIG. 2, the system may include an electronic apparatus 100 and an external server 200

In the drawings, although the electronic apparatus 100 has been illustrated as being implemented to a mobile device such as a smartphone, the embodiment is not limited thereto, and may be implemented to apparatuses of various types with the function capable of receiving input of voice such as an AI speaker.

The electronic apparatus 100 may store the personal assistant program. Based on the pre-set user command being input, the electronic apparatus 100 may execute or activate the personal assistant program.

The electronic apparatus 100 may, based on receiving the voice, obtain information on the voice through the personal assistant program, and determine the category corresponding to the information and the operation mode. The electronic apparatus 100 which determined the operation mode may transmit the received voice to the external server 200 which stores the trained artificial intelligence model. The electronic apparatus 100 may transmit the text information corresponding to the voice and a history information to the external server 200. The text information may be converted through a speak to text (STT) model with respect to the input voice, and the history information may accumulate and store the result analyzed through the artificial intelligence model in the corresponding operation mode.

The external server 200 may, based on the text information and the history information received from the electronic apparatus 100, determine an artificial intelligence model corresponding to the operation mode determined in the electronic apparatus 100. In addition, the external server 200 may perform natural language processing on the received text information, and analyze the voice by inputting the natural language processed text information and history information to the determined artificial intelligence model. For example, based on the operation mode determined by the electronic apparatus 100 being a conversation analysis mode, the external server 200 may output an analysis result of the keyword information and emotion information (e.g., pleasurable conversation, sorrowful conversation, etc.) on the voice, and the like by inputting the natural language processed text information and the history information to the trained algorithm corresponding to the conversation analysis mode. The above-described trained algorithms are merely one embodiment, and the external server 200 may receive input of voice through various artificial intelligence models and output the control instruction corresponding thereto.

Based on a second voice being input after the personal assistant program is executed, the electronic apparatus 100 may determine a category corresponding to the second voice and the operation mode, and may transmit the text information of the input second voice and the history information to the external server 200. Based on the electronic apparatus 100 determining a mode corresponding to the second voice as a second operation mode while performing the operation of analyzing voice and receiving an output first control instruction through the artificial intelligence model corresponding to the first operation mode from the external server 200, the electronic apparatus 100 may transmit text information and history information corresponding to the second voice to the external server 200. The external server 200 may output a second control instruction by inputting a second voice text information and history information to the artificial intelligence model corresponding to the second operation mode, and transmit the second control instruction to the electronic apparatus 100. The electronic apparatus 100 may output operations corresponding to each of the first control instruction and the second control instruction through the personal assistant program.

The personal assistant program of the electronic apparatus 100 and the external server 200 may include an information transmitting standard therebetween for transmitting text information and history information (or, content information). The information transmitting standard may be a standard for transmitting information between the personal assistant program and the external server 200, and may transmit and receive information by using structural information of the external server 200. Accordingly, the personal assistant program of the electronic apparatus 100 may transmit text information and history information based on the information transmitting standard.

In the above-described embodiment, the voice analysis through the artificial intelligence model has been described as taking place in the external server 200, but the embodiment is not limited thereto, and the voice analysis through the artificial intelligence model may be performed in the electronic apparatus 100 without transmitting and receiving information with the external server 200. However, the voice analysis has been described as being performed in the external server 200 below.

Figure 3:
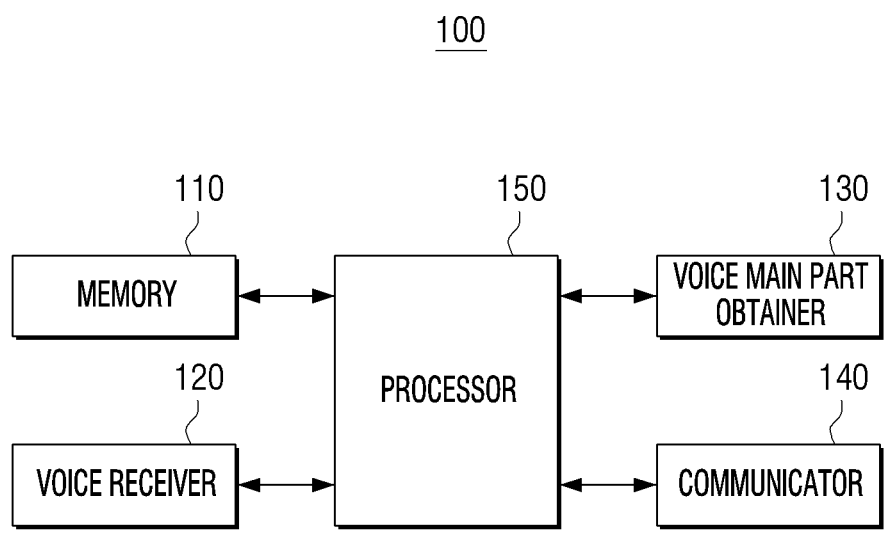
FIG. 3 is a block diagram schematically illustrating a configuration of an electronic apparatus according to an embodiment of the disclosure.
Figure 4:
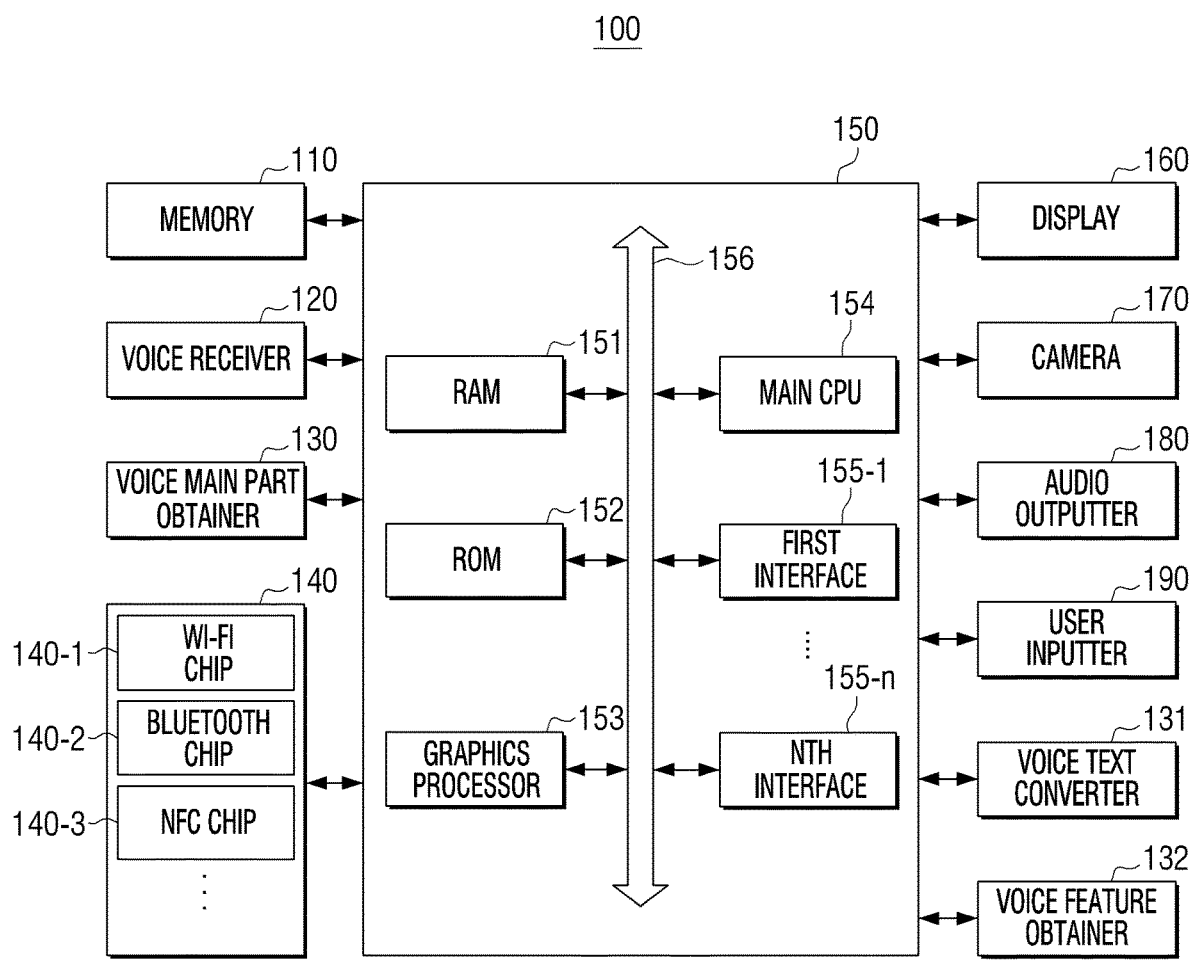
FIG. 4 is a block diagram illustrating in detail a configuration of an electronic apparatus according to an embodiment of the disclosure.

FIGS. 3 and 4 are block diagrams illustrating a configuration of an electronic apparatus according to an embodiment of the disclosure. As illustrated in FIG. 3, the electronic apparatus may include a memory 110, a voice receiver 120, and a voice main part obtainer 130. The configurations illustrated in FIG. 3 are exemplary views for realizing embodiments of the disclosure, and hardware/software configurations apparent to those skilled in the related art may be may be additionally included in the in the electronic apparatus 100.

The memory 110 may store an instruction or data related to at least one other elements of the electronic apparatus 100. The memory 110 may be implemented as a non-volatile memory, a volatile memory, a flash-memory, a hard disk drive (HDD), a solid state drive (SSD), or the like. The memory 110 may be accessed by the processor 140 and reading/writing/modifying/deleting/updating of data by the processor 140 may be performed. In the disclosure, the term memory may include the memory 110, a read only memory (ROM) 142 in the processor 140, a random access memory (RAM) 141, or a memory card (not shown; e.g., a micro SD card, a memory stick) mounted to the electronic apparatus 100. Further, the memory 110 may store a program, data, and the like for configuring various screens to be displayed in the display area of the display 160.

The memory 110 may store a personal assistant program. The personal assistant program may be a personalized program for providing various services with respect to the electronic apparatus 100. Further, according to an embodiment, the memory 110 may store a plurality of artificial intelligence models for voice analysis and a trained algorithm. In addition, the memory 110 may store information on a plurality of categories, and a database including a plurality of voice data pattern models corresponding to the plurality of categories, which will be described in greater detail below.

The voice receiver 120 may be a configuration for receiving an analog voice signal which is commonly input. The voice receiver 120 may include a configuration such as a microphone to receive voice. The voice receiver 120 may not only receive the voice of the user and the counterpart of the phone call, but also a voice conversation between the user and a third party without interaction through an electronic apparatus. The voice receiver 120 may convert a main parameter (e.g., size information of the analog voice signal) for identifying the analog voice signal and a sub parameter (e.g., direction information of the analog voice signal) to a voice recognition data (digital). The voice recognition data converted by the method above may be converted to, for example, a 1-byte voice recognition data including only the size information of the analog voice signal according to time change (T1, . . . , TN), or to, for example, a 4-byte voice recognition data including the size and direction information of the analog voice signal according to time change (T1, . . . , TN). Accordingly, voice recognition may be improved for not only voice conversations by phone but also for outdoor conversations by using the various parameters described above.

The voice main part obtainer 130 may a configuration for receiving the voice recognition data converted from the voice receiver 120, identifying the voice recognition data, and obtaining a voice main part information. The voice main part obtainer 130 may receive main part information of a voice taking into consideration both the main parameter (size of voice) and the sub parameter (direction of voice). The voice main part information may include various information such as mechanical sound/recording sound information, age information, and gender information. The voice main part obtainer 130 may classify the voice recognition data to a phoneme unit capable of determining a category of voice, and obtain minimum information such as a vowel unit of the classified phonemes.

The communicator 140 may perform communication with external apparatuses through various communication methods. In particular, the communicator 140 may receive voice analysis result or control instruction by performing communication with the external server 200.

The processor 150 may be electrically connected with the memory 110, the voice receiver 120, the voice main part obtainer 130, and the communicator 140 and may control the overall operation and function of the electronic apparatus 100. The processor 150 may control the voice receiver 120 to receive input of voice, and control the voice main part obtainer 130 to obtain main part in input voice. In addition, the processor 150 may obtain the category information of the input voice by comparing the voice model data patterns within the database stored in the memory 110 with the obtained voice main part. The processor 150 may control the communicator 140 to transmit the input voice to the external server 200, and control the communicator 140 for the external server 200 to receive the output result by inputting the voice to the artificial intelligence model and analyzing the voice. The processor 150 may perform functions based on the control instruction received through the communicator 140, and may control the memory 110 to store the received analysis result. The processor 150 may obtain the category information on the input voice, and a method of performing the function in the operation mode corresponding thereto will be described in detail below.

FIG. 4 is a block diagram illustrating in detail a configuration of an electronic apparatus 100 according to an embodiment of the disclosure. As illustrated in FIG. 4, the electronic apparatus 100 may include a memory 110, a voice receiver 120, a voice main part obtainer 130, a voice text converter 131, a voice feature obtainer 132, a communicator 140, a processor 150, a display 160, a camera 170, an audio outputter 180, and a user inputter 190. Because the memory 110, the voice receiver 120, and the voice main part obtainer 130 has been described in FIG. 3, redundant descriptions thereof will be omitted.

The voice text converter 131 may be a configuration for converting the received voice to text. The voice text converter 131 may use the speak to text (STT) module to convert the voice to text.

The voice feature obtainer 132 may be a configuration for obtaining a voice feature included in the voice. The voice feature obtainer 132 may obtain features such as shaking information, tone information, and the like of the voice.

The communicator 140 may perform communication with external devices of various types based on the communication methods of various types. The communicator 140 may include at least one of a Wi-Fi chip 140-1, a Bluetooth chip 140-2, and a near field communication (NFC) chip 140-3. The processor 150 may use the communicator 140 to perform communication with the external server 200 or with various external devices. In addition thereto, the communicator 140 may perform communication with an external device through various communication chips such as a NFC chip.

The camera 170 may photograph images including external objects. The camera 170 may be provided to at least one of the front and back of the electronic apparatus 100. The camera 170 may be provided in the electronic apparatus 100, but this is merely one embodiment, and may be present externally of the electronic apparatus 100, and the camera may be wired/wirelessly connected to the electronic apparatus 100.

The audio outputter 180 may be a configuration which outputs not only various audio data to which various processing operations such as decoding, amplifying, and noise filtering have been performed by the audio processor (not shown), but also various notification sounds or voice messages. The audio outputter 180 may be implemented as a speaker, but this is merely one embodiment, and may be implemented as a output terminal capable of outputting audio data.

The audio outputter 180 may provide information on the search result to the user in audio form.

The processor 150 (or, controller) may control the overall operation of the electronic apparatus 100 by using various programs stored in the memory 110.

The processor 150 may include a random access memory (RAM) 151, a read only memory 152, a graphics processor 153, a main CPU 154, a first to nth interface 155-1 to 155-$n$, and a bus 156. The RAM 151, the ROM 152, the graphics processor 153, the main CPU 154, the first to nth interface 155-1 to 155-$n$, and the like may be interconnected through the bus 156.

The user inputter 190 may receive various user input and transfer to the processor 150. The user inputter 190 may include a touch sensor, a (digital) pen sensor, a pressure sensor, and a key. The touch sensor may, for example, use at least one method of a capacitive-type, a resistive-type, an infrared method, or an ultrasonic method. The (digital) pen sensor may, for example, be implemented as a part of the touch panel or may include a separate sheet for recognition.

The key may, for example, include a physical button, an optical key, or a keypad. The microphone may, as a configuration for receiving user voice, be provided in the electronic apparatus 100, but this is merely one embodiment, and the microphone may be provided externally of the electronic apparatus 100 and be electrically connected with the electronic apparatus 100.

The user inputter 190 may obtain an input signal based on the pre-set user touch for selecting an icon corresponding to the personal assistant program or the user input selecting the button provided on the exterior of the electronic apparatus 100. The user inputter 190 may transmit the input signal to the processor 150.

Figure 5B:
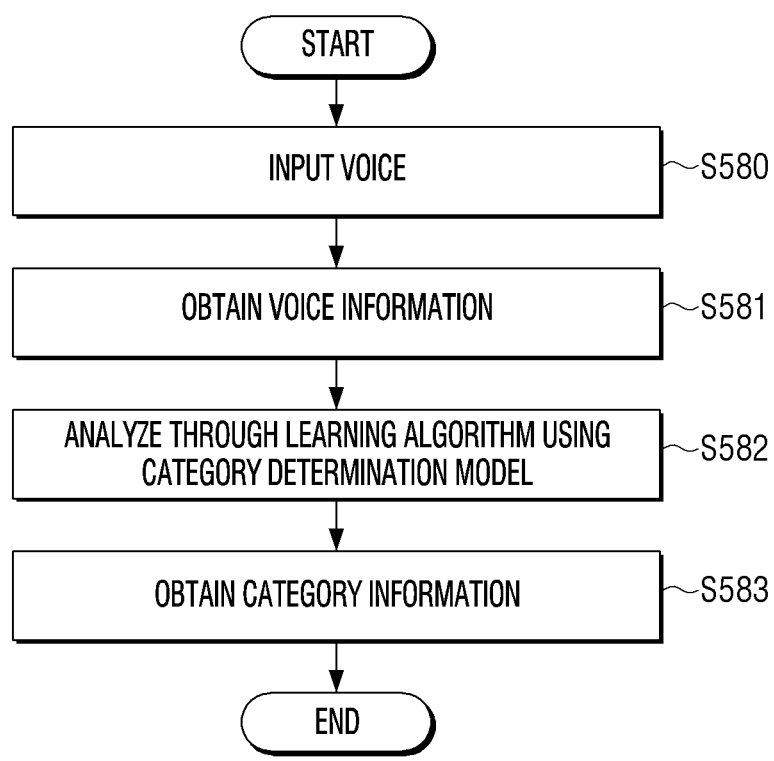

FIGS. 5A and 5B are flowcharts illustrating a method of obtaining category information on a voice by an electronic apparatus according to an embodiment of the disclosure.

FIG. 5A illustrates the method of obtaining category information on the voice through comparison with the database stored in the memory 110 by the electronic apparatus 100, and FIG. 5B illustrates the method of obtaining category information on the voice through the learning algorithm by the electronic apparatus 100.

Referring to FIG. 5A, the electronic apparatus 100 may receive input of the voice S510, and obtain a digital voice recognition data for recognizing and processing the analog voice signal in the electronic apparatus 100 S520.

The electronic apparatus 100 may remove a noise component by separating the voice recognition data on the noise component of the surrounding environment included in the converted voice recognition data and the voice recognition data on a voice signal input through a conversation S530.

The electronic apparatus 100 may easily distinguish the noise removal processed voice recognition data. For example, the voice signal may be classified to a phoneme unit, the voice main part information such as the vowel unit of the classified phonemes may be obtained, and various information such as a mechanical sound/recording sound determination information, an age classification information, and a gender classification information may be included in the main part information.

The electronic apparatus 100 may compare the obtained voice main part information with the plurality of voice model data patterns S550. The voice model data pattern may refer to a registered pattern which modeled a common feature of the voice signals of random speakers, and the voice model data pattern may be pre-stored in a voice database (hereinafter, referred to as voice DB), and the like. The plurality of voice model data patterns may be a pattern corresponding to the plurality of categories. For example, the voice phishing voice may have a common feature with the mechanical sound/recording sound. That is, the voice phishing voice model pattern may be a registered pattern that modeled the common feature, and the voice phishing voice model pattern may be a pattern corresponding to the voice phishing category. However, this is merely one embodiment, and various voice model patterns may correspond to various categories.

The electronic apparatus 100 may, based on the comparing the voice model data pattern and the obtained voice main part information, identify whether a matching voice model data pattern and category is present S560. The identification result may, if a voice model data pattern matching the voice main part information is present S560-Y, obtain information on category corresponding to the corresponding voice model data pattern S570.

In the above-described embodiment, the method of obtaining category information through a comparison of the main part information on the voice and the voice model data pattern in database has been described, but the category information of voice may also be obtained through a trained artificial intelligence model. For example, referring to FIG. 5, the electronic apparatus 100 may input the voice to the trained artificial intelligence model and obtain the category information on the voice.

Specifically, the electronic apparatus 100 may receive input of voice S580, and obtain information on the voice S581. The information on the voice may be a voice frequency information. The electronic apparatus 100 may input information on the obtained voice to the artificial intelligence model trained to determine category S582. The artificial intelligence model for determining category may output category information corresponding to the input voice information S582. The artificial intelligence model may be stored in the memory 110 within the electronic apparatus 100, or stored in the external server 200. Further, the artificial intelligence model may also be stored in a second electronic apparatus (not shown) other than the electronic apparatus 100.

According to the method of obtaining a category as described in FIGS. 5A and 5B, there may be the effect of being able to quickly analyze a voice without having to analyze the entire voice through primary categorizing with respect to the input voice.

Based on a voice model data pattern that matches with the information of the voice not being present in the database, the electronic apparatus 100 may determine the category of voice as an uncategorized category. The detailed operation in case the input voice falls within the uncategorized category will be described in greater detail below.

Figure 6:
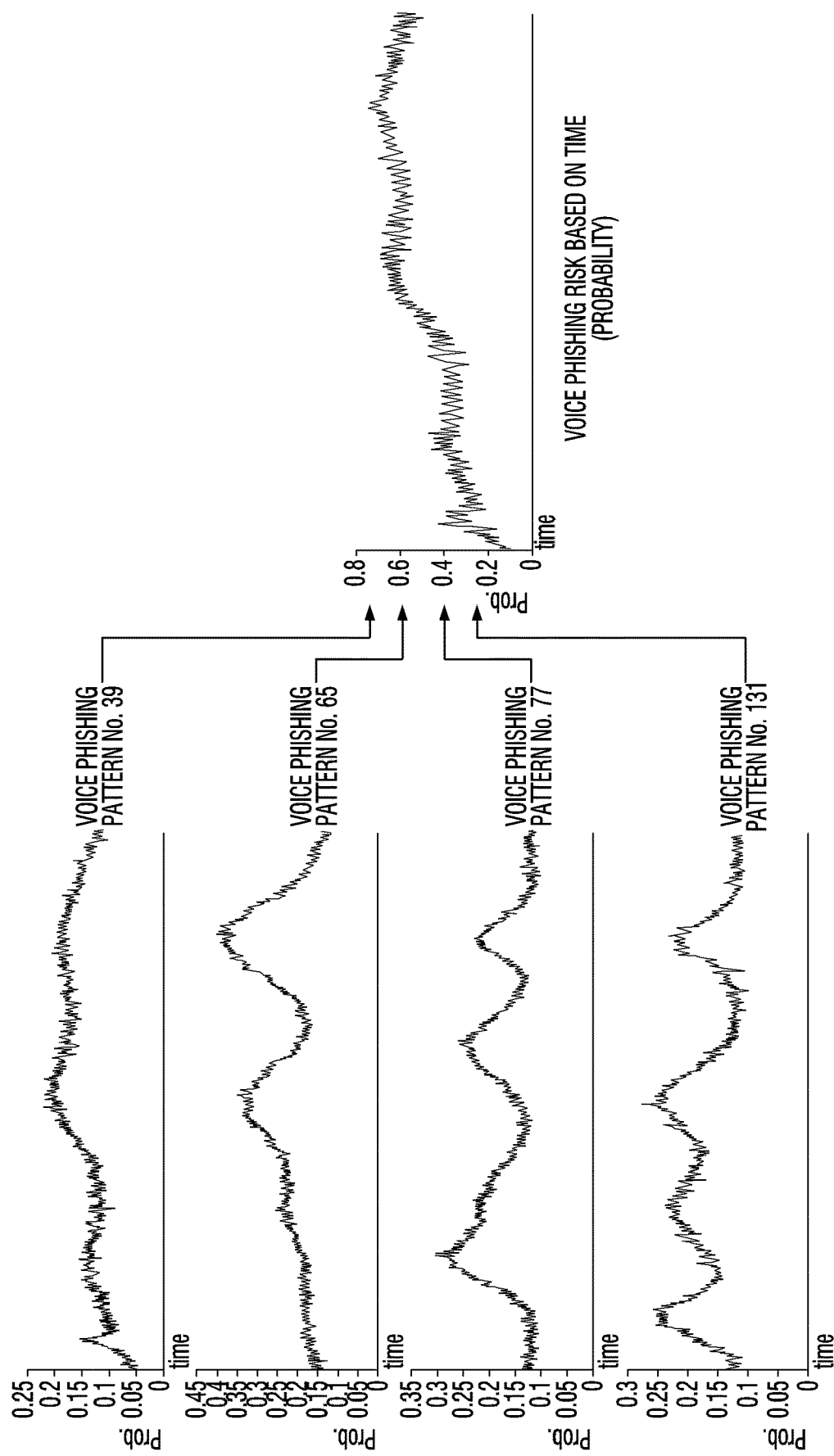
FIG. 6 is a diagram illustrating a method of identifying a voice category as a voice phishing category through comparison with a voice phishing model data pattern according to an embodiment of the disclosure.

FIG. 6 is a diagram illustrating a process of identifying a voice category as a voice phishing category.

The electronic apparatus 100 may compare the voice phishing model data pattern with the voice recognition data obtained from the voice and the voice main part data. The memory 110 of the electronic apparatus 100 may store the model data pattern for determining various voice phishing in the database. The electronic apparatus 100 may, through a comparison of the voice recognition data and the plurality of voice phishing model data patterns in the database, select a specific pattern with a high similarity.

Referring to FIG. 6, the electronic apparatus 100 has been illustrated as having selected voice phishing pattern NO.39, NO.65, NO.77, and NO.131 as patterns with high similarity, and the electronic apparatus 100 may additionally compare the similarity of the voice main part information with the selected voice phishing patterns. If the electronic apparatus 100 determines that the risk for voice phishing is high based on the similarity between the voice main part information and the selected voice phishing pattern being high, the electronic apparatus 100 may determine the input voice as a voice phishing category.

In the drawings, only a comparison of the voice phishing model data pattern and the voice information has been illustrated to determine as a voice phishing category, but the embodiment is not limited thereto, and the model pattern for determining various categories may also be compared with the voice information to determine category.

The category on the voice determined by the above-described method may not be a one on one corresponding relationship with each of the operation modes. For example, when receiving a phone call from a foreign friend, the electronic apparatus 100 may classify the input voice in the acquaintance category, and may determine a English call mode and conversation analysis mode as the operation mode corresponding thereto.

Figure 7:
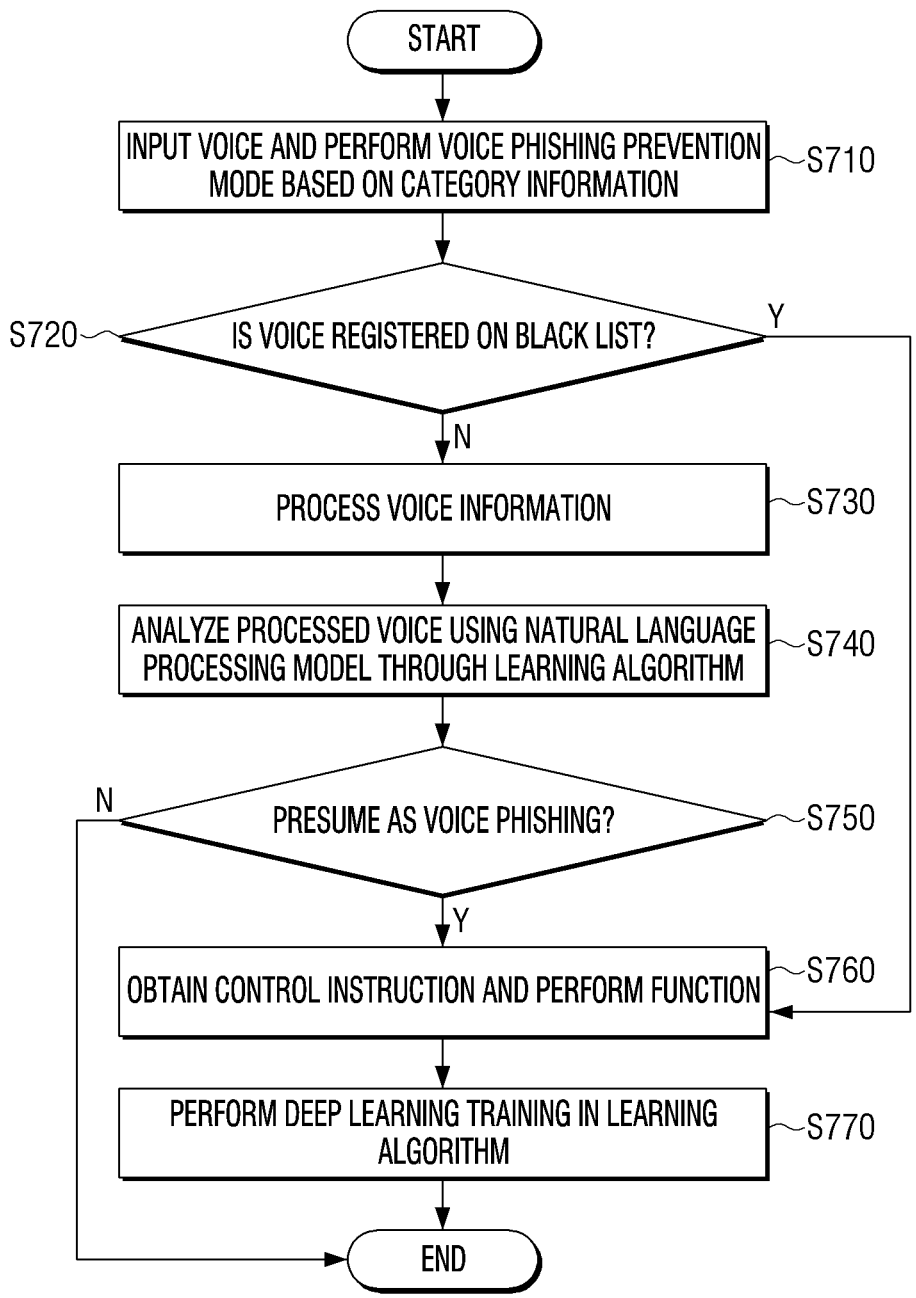
FIG. 7 is a flowchart illustrating a method in which an electronic apparatus operates at a voice phishing operation mode according to an embodiment of the disclosure.
Figure 8:
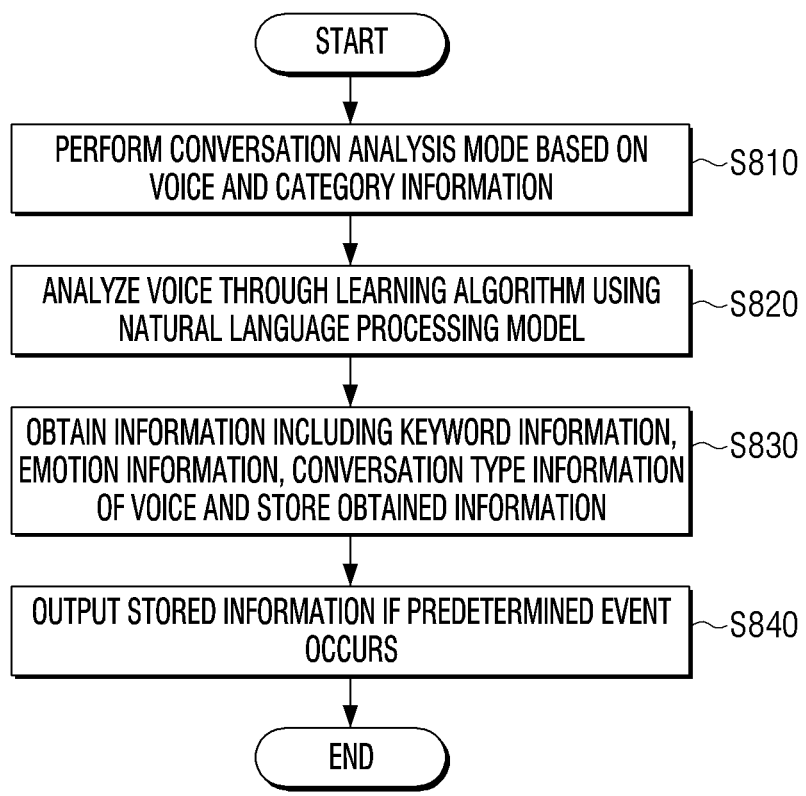
FIG. 8 is a flowchart illustrating a method in which an electronic apparatus operates at a conversation analysis operation mode according to an embodiment of the disclosure.

FIGS. 7 to 9 illustrate a method of performing a voice analysis and function through an operation mode corresponding to each category by an electronic apparatus which determined the category of voice through the above-described method.

FIG. 7 is a flowchart illustrating a method of operating in a voice phishing operation mode by the electronic apparatus.

The electronic apparatus 100 may, even when having obtaining the voice phishing category information based on the method described in FIGS. 5A, 5B and 6, perform the voice phishing prevention mode based on the category information S710. The electronic apparatus 100 may, even when not having obtaining the voice phishing category information, perform the voice phishing prevention mode according to a pre-set setting. For example, the electronic apparatus 100 may perform an operation through the voice phishing prevention mode even when having obtained the uncategorized category information through the received voice.

The electronic apparatus 100 may identify whether the received voice is a voice registered on a black list on the voice phishing prevention mode S720. If the received voice is a voice registered on the black list S720-Y, the electronic apparatus 100 may obtain a control instruction for performing at least one function on the voice phishing prevention mode, and perform the function S760. The function of the voice phishing prevention mode may include displaying a report button, limiting a financial application, a voice phishing alarm, and the like, but is not limited thereto.

If the received voice is not a voice registered on the black list S720-Y, the electronic apparatus 100 may perform information processing to obtain voice feature information from the received voice S730. The voice feature information may include a shaking information, a tone information, a number of phonemes per unit time information, and the like of the voice, but is not limited thereto. The electronic apparatus 100 may input the obtained voice feature information and voice through a learning algorithm by using a natural language processing model corresponding to the voice phishing prevention mode S740. As described above, the voice analysis based on the learning algorithm using the natural language processing model may be performed in the external server 200 or within the electronic apparatus 100. For example, the personal assistant program of the electronic apparatus 100 may perform an analysis of the received voice with the learning algorithm stored in the memory 110, or perform an analysis with the learning algorithm stored in the external server 200 by transmitting the voice and the voice feature information to the external server 200 through the communicator 140.

Based on analyzing the voice through the learning algorithm corresponding to the voice phishing prevention mode, if the input voice is presumed as a voice phishing voice S750-Y, the electronic apparatus 100 may obtain a control instruction to perform one function of the voice phishing prevention mode, and perform a function corresponding thereto S760. As described above, the function of the voice phishing prevention mode may include displaying a report button, limiting a financial application, a voice phishing alarm, and the like, but is not limited thereto.

The electronic apparatus 100 may train the learning algorithm with deep learning to derive an accurate result when performing analysis on the analyzed result on the corresponding voice at a later time S770.

FIG. 8 is a flowchart illustrating a method of operating in a conversation analysis operation mode by the electronic apparatus.

The electronic apparatus 100 may, based on obtaining family or acquaintance category information according to the method described in FIGS. 5A, 5B and 6, perform the conversation analysis mode based on the category information S810. The electronic apparatus 100 may perform the conversation analysis mode according to a pre-set setting even when not having obtained the family or the acquaintance category information. For example, the electronic apparatus 100 may perform an operation through the conversation analysis mode even when having obtained the uncategorized category information through the received voice.

The electronic apparatus 100 may input the received voice through the learning algorithm by using the natural language processing model corresponding to the conversation analysis mode S820. As described above, the voice analysis performed based on the learning algorithm using the natural language processing model may be performed in the external server 200, or within the electronic apparatus 100. For example, the personal assistant program of the electronic apparatus 100 may perform an analysis on the received voice using the learning algorithm stored in the memory 110, or perform an analysis with the learning algorithm stored in the external server 200 by transmitting the voice and the voice feature information to the external server 200 through the communicator 140.

The learning algorithm using the natural language processing model may, based on analyzing the received voice, output information including keyword information and emotion information of a voice, and conversation type information. The keyword information may be information on words with the highest frequency in a conversation between the user and the counterpart, the emotion information may be information on the emotional state of the user or the counterpart, and the conversation type information may be information on the type of negative/positive conversation, but the embodiment is not limited thereto.

The electronic apparatus 100 may store output information to the memory 110 S830, or output using a function of the conversation analysis mode through the display 160 or the audio outputter 180, which will be described in greater detail below. The function of the conversation analysis mode may include displaying the interest keyword frequency included within a pre-set period, providing information links related to the keyword, and displaying frequency of negative conversation within a pre-set period.

The electronic apparatus 100 may store the information output through the trained algorithm in the memory 110, and may use a function of the conversation analysis mode on the user to output the information if a pre-set event occurs. The pre-set event may be the end of a conversation or a phone call of the user, or a user command of a user instructing the personal assistant program to output the result, but is not limited thereto. The above will be described in greater detail below while describing the function of the conversation analysis mode.

Figure 9A:
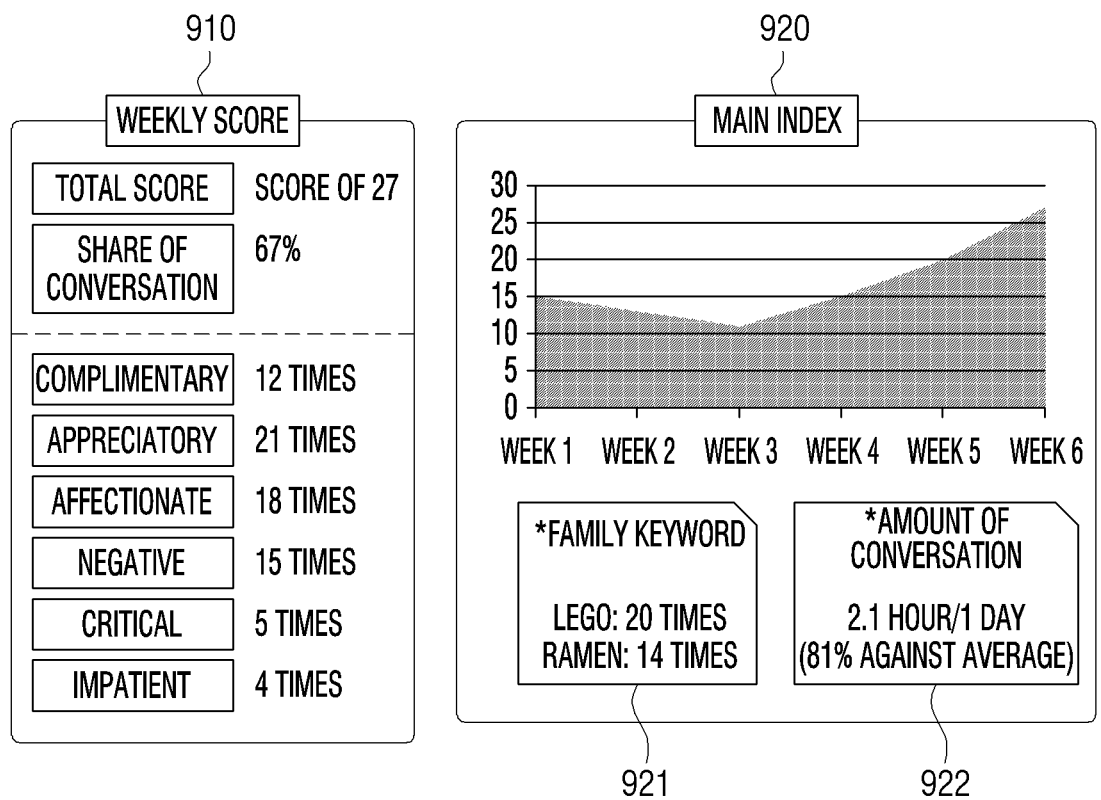
FIGS. 9A to 9C are diagrams illustrating a function of a conversation analysis mode according to an embodiment of the disclosure.
Figure 9B:
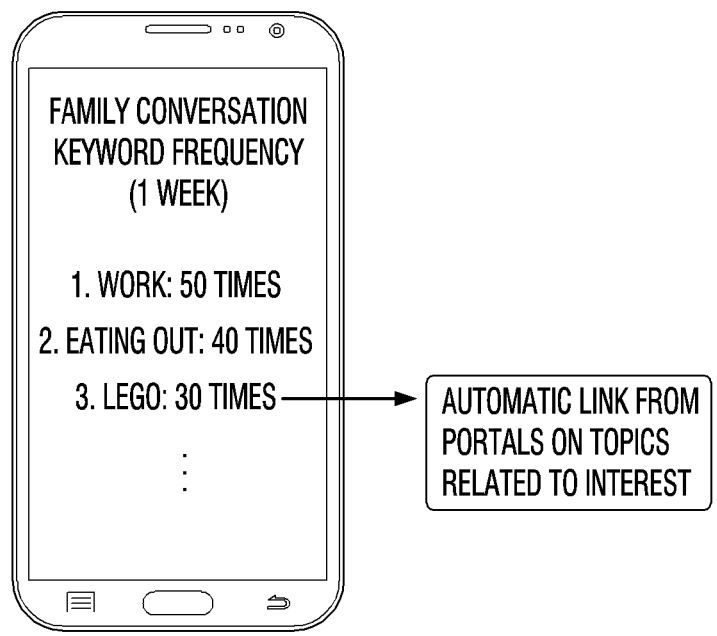
Figure 9C:
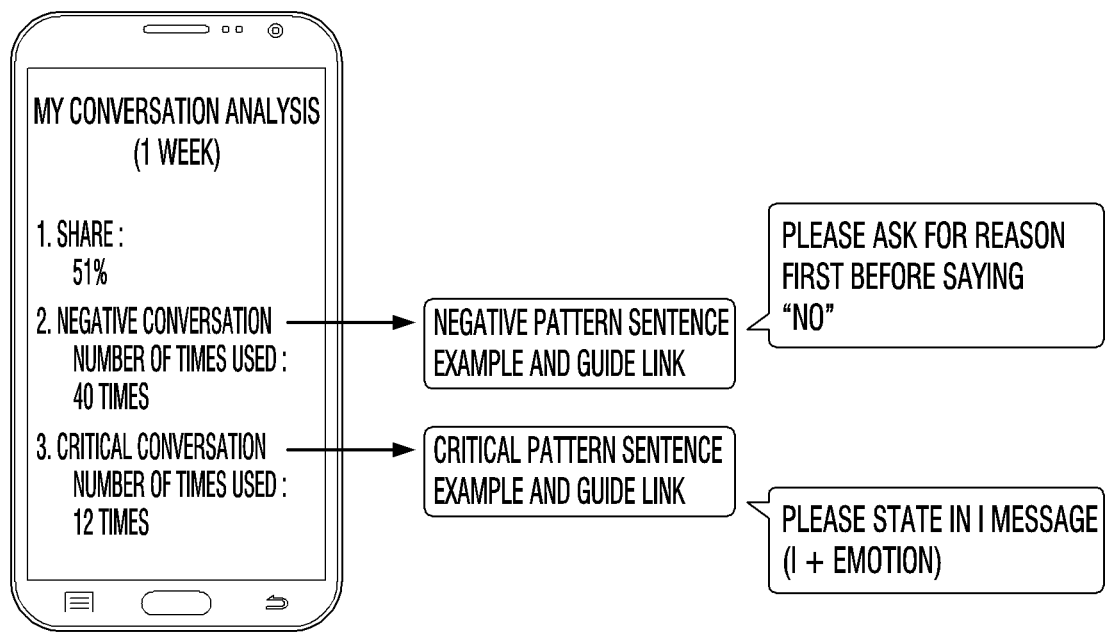

FIGS. 9A to 9C are diagrams illustrating a function of the conversation analysis mode.

FIG. 9A is a diagram for describing a function of the conversation analysis mode representing the analyzed result of a conversation by the user with counterparts that are categorized in the family category. Referring to FIG. 9A, the electronic apparatus 100 may analyze the conversation of the user with family members, and display an output result of a weekly score 910 and a main index 920.

The electronic apparatus 100 may store an output result of positive conversation types such as complimentary, appreciatory, and affectionate conversations and negative conversation types such as negative, critical, and impatient conversations obtained through an analysis of conversations between the user and family members in the memory 110 as history information. In addition, the electronic apparatus may store a keyword output result through an analysis of the conversations between the user and family members in the memory 110 as history information, and also store an output result on the amount of conversation between the user and family members in the memory 110.

The electronic apparatus 100 may, if a pre-set event occurs, output history information and conversation analysis result stored in the memory 110. The pre-set event may be the end of a conversation or a phone call of the user, or a user command of a user instructing the personal assistant program to output the result, but is not limited thereto. For example, the pre-set event may be an event, by the user, of inputting the voice 'how was the conversation with family members last week?' through the personal assistant program, or the user selecting an icon displayed in the personal assistant program. If a pre-set event occurs, the electronic apparatus 100 may provide the weekly score 910 and the main index 920 to the user through the display 160. However, the embodiment is not limited thereto, and the electronic apparatus 100 may also provide the result on the weekly score 910 and the main index 920 to the user through the audio outputter 180.

FIGS. 9B and 9C are diagrams illustrating an embodiment in which the electronic apparatus provides an additional function related to the function of the conversation analysis mode.

FIG. 9B illustrates an embodiment in which an automatic link is provided with respect to a specific keyword when the electronic apparatus 100 provides a keyword based on the conversation analysis. Referring to FIG. 9B, the electronic apparatus 100 may provide an automatic link from a topic portal related to 'Lego' which is one of the keywords displayed to the user. The automatic link may be connected through an interaction directly selected by the user, or connected through an interaction in which the user inputs a voice command of 'connect Lego links' to the personal assistant program, but the embodiment is not limited thereto.

FIG. 9C illustrates an embodiment in which the electronic apparatus 100 provides an example sentence or a guide related to a conversation of a specific type after providing a conversation type analysis result. The electronic apparatus 100 may provide an accumulated result of number of times negative conversation is used in a sentence by the user, and provide a guide to correct the same. For example, referring to FIG. 9C, the number of times negative conversation is used by the user may be 40 times, and the electronic apparatus 100 may provide a link such as "before saying 'no' please first ask for reason" as a guide to make conversation between the user and family members positive. Likewise, the number of times critical conversation is used by the user may be 12 times, and the electronic apparatus 100 may provide a link such as "please speak in a I message." The embodiment is merely one example, and various guide links may be provided for various conversation types. The link may be provided through an interaction directly selected by the user, or provided through an interaction in which the user inputs a voice command such as 'provide voice guide' to the personal assistance program.

Although not illustrated in the drawings, the electronic apparatus 100 may perform various operation modes. For example, in the case of speech practice mode, the electronic apparatus 100 may input the received voice to the artificial intelligence model corresponding to the speech practice mode. The artificial intelligence model corresponding to the speech practice mode may be stored in the electronic apparatus 100, or included in the external server 200. The artificial intelligence model may output at least one information of a grammar information, a pronunciation information, and an intonation information of the voice upon receiving voice. That is, the artificial intelligence model may output information on grammatical error, pronunciation error, intonation error, and the like with respect to the corresponding language of the input voice. The electronic apparatus 100 may store the information output from the artificial intelligence model on the memory 110.

The electronic apparatus 100 may, based on a pre-set event occurring, output the history information and the conversation analysis result stored in the memory 110. The pre-set event may be the end of a conversation or a phone call of the user, or the user command of the user instructing the personal assistant program to output the result, but is not limited thereto. For example, the pre-set event may be an event in which the user inputs voice of 'how was my English pronunciation last week?' through the personal assistant program, or an event in which a user selects an icon to be displayed in the personal assistant program. If a pre-set event occurs, the electronic apparatus 100 may provide a display of pronunciation error frequency within a pre-set period (not shown) and a display of grammatical error frequency (not shown) within a pre-set period (not shown) to the user through the display 160, but the embodiment is not limited thereto. In addition, the electronic apparatus 100 may also provide results on the pronunciation error frequency within the pre-set period (not shown) and the grammatical error frequency within the pre-set period (not shown) to the user through the audio outputter 180.

The electronic apparatus 100 may, based on determining the operation mode of the received voice as a basic mode, perform a voice analysis and function according to the pre-set basic mode. The pre-set basic mode may be set at the time of release, or may be a mode set by the user.

Based on the pre-set basic mode being an automatic mode, the electronic apparatus 100 may input the received voice to a plurality of artificial intelligence models corresponding to the plurality of operation modes. The plurality of operation modes may be operation modes stored in the memory 110. The plurality of artificial intelligence models may be a trained algorithm operating in each of the operation modes, and may be stored in the memory 110 or stored in the external server 200.

The plurality of artificial intelligence models may analyze the input voice and output information corresponding thereto. For example, while analyzing through the plurality of artificial intelligence models, if a voice input with a voice phishing prevention model is identified as a high risk voice phishing voice, a control instruction capable of performing at least one function of the voice phishing prevention mode may be output.

The electronic apparatus 100 may identify an operation mode corresponding to an output information based on the output information obtained in the plurality of artificial intelligence models. For example, if the output information is a control instruction capable of performing at least one function of the voice phishing prevention mode, the electronic apparatus 100 may determine the operation mode with the voice phishing prevention mode, and perform a function corresponding to the control instruction.

The electronic apparatus 100 may determine the category information of the operation model corresponding to the output information. For example, if the operation mode corresponding to the output information is an English call mode, the electronic apparatus 100 may determine a pre-set acquaintance category and a foreigner category to correspond to the English call mode.

The electronic apparatus 100 may update the voice model data pattern corresponding to the category information stored in the memory 110 based on the received voice and the main part information of the voice to distinguish the determined category. That is, the electronic apparatus 100 may, based on the voice classified as an uncategorized category being input again at a later point, use the updated database to classify the voice to an appropriate category.

The electronic apparatus 100 has been described as including the voice receiver 120 and the voice main part obtainer 130, but according to an embodiment of the disclosure, the voice receiver 120 and the voice main part obtainer 130 may be included in a second electronic apparatus (not shown) separate from the electronic apparatus 100. The second electronic apparatus and the electronic apparatus 100 may be connected via wireless communication and may transmit and receive information. The second electronic apparatus may receive voice conversation input from a space different from the electronic apparatus 100 of the user, and may analyze the voice. The artificial intelligence model analyzing the voice may be stored in the second electronic apparatus, stored in the electronic apparatus 100, or stored in the external server 200. Based on the artificial intelligence model being stored in the electronic apparatus 100 or the external server 200, the second electronic apparatus may transmit the input voice and the information on the voice to the electronic apparatus 100 or the external server 200.

According to an embodiment, the user may place the second electronic apparatus on a table mainly used by the family of the user, and check the analysis result of conversation between family members through the electronic apparatus 100 and receive guiding. In addition, the second electronic apparatus may be connected with a third electronic apparatus (not shown) carried by a family member of the user via wireless communication, and the family member of the user may receive the conversation analysis result and guide through the third electronic apparatus.

According to an embodiment, as illustrated in FIGS. 10 to 13, a condition and action, and an event to be detected based on the condition and a function to be executed according to the action may be determined through the data recognition model after generating the data recognition model using the learning algorithm.

Figure 10:
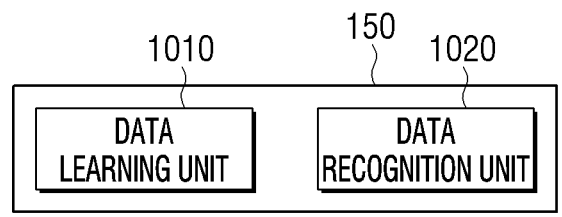
FIGS. 10 to 13 are diagrams illustrating a configuration and method for identifying a condition and an action, and an event to be detected according to a condition and a function to be executed according to an action through a data recognition model after generating the data recognition model using a learning algorithm according to an embodiment of the disclosure.

Referring to FIG. 10, the processor 150 according to an embodiment may include a data learning unit 1010 and a data recognition unit 1020.

The data learning unit 1010 may be generated or trained so that the data recognition model may have a criterion for identifying a predetermined circumstance (e.g., condition and action, event according to condition, identifying function according to action, etc.). The data learning unit 1010 may, in order to identify a predetermined circumstance, apply the learning data to the data recognition model, and generate a data recognition model with an identification criterion.

In an example, according to an embodiment, the data learning unit 1010 may generate or train the data recognition model by using learning data related to voice information and learning data related to image information.

In an another example, the data learning unit 1010 may generate and train the data recognition model by using the learning data related to condition and learning data related to action.

In a still another example, the data learning unit 1010 may generate and train the data recognition model by using the learning data related to the event and the learning data related to the function.

The data recognition unit 1020 may identify a circumstance based on the recognized data. The data recognition unit 1020 may use the trained data recognition model to identify the circumstance from the predetermined recognized data. The data recognition unit 1020 may obtain the pre-set recognition data based on a predetermined criterion, and by applying the obtained recognition data to the data recognition model as an input value, identify (or, estimate) a predetermined circumstance based on the predetermined recognition data.

In addition, the result value output by applying the obtained recognition data to the data recognition model as an input value may be used to update the data recognition model.

According to an embodiment, the data recognition unit 1020 may, by applying recognition data related to the voice information and the recognition data related to the image information to the data recognition model as an input value, obtain an identification result (e.g., condition and action requiring execution according to condition) in which the circumstance of the electronic apparatus 100 is identified.

In addition, the data recognition unit 1020 may, by applying recognition data related to condition and recognition data related to action to the data recognition model as an input value, obtain an identification result (e.g., an event to be detected according to condition, a function to be executed according to action) in which the circumstance of the electronic apparatus 100 is identified.

In addition, the data recognition unit 1020 may, by applying recognition data related to an event and recognition data related to function to the data recognition model as an input value, obtain an identification result (e.g., detection resource to detect an event, execution resource to execute a function) in which the circumstance of the electronic apparatus 100 is identified.

At least a portion of the data learning unit 1010 and at least a portion of the data recognition unit 1020 may be implemented as software modules or at least one hardware chip form and mounted in the electronic apparatus. For example, at least one of the data learning unit 1010 and the data recognition unit 1020 may be manufactured in the form of a dedicated hardware chip to artificial intelligence (AI), or a conventional generic-purpose processor (e.g., a CPU or an application processor) or a graphics-only processor (e.g., a GPU) and may be mounted on various electronic apparatuses as described above. Herein, the dedicated hardware chip for artificial intelligence may be a dedicated processor for probability calculation, which exhibits higher parallel processing performance than existing generic-purpose processors, and may quickly process computation tasks in artificial intelligence such as machine learning. When the data learning unit 1010 and the data recognition unit 1020 are implemented as a software module (or a program module including an instruction), the software module may be stored in a computer-readable non-transitory computer readable media. In this case, the software module may be provided by an operating system (OS) or by a predetermined application.

Alternatively, some of the software modules may be provided by an O/S, and some of the software modules may be provided by a predetermined application.

In this case, the data learning unit 1010 and the data recognition unit 1020 may be mounted on one electronic apparatus, or may be mounted on separate electronic apparatuses, respectively. For example, one of the data learning unit 1010 and the data recognition unit 1020 may be implemented in the electronic device 100, and the other one may be implemented in the external server 200. In addition, the data learning unit 1010 and the data recognition unit 1020 may provide the model information constructed by the data learning unit 1010 to the data recognition unit 1020 via wired or wireless communication, and provide data which is input to the data recognition unit 1020 to the data learning unit 1010 as additional learning data.

Figure 11:
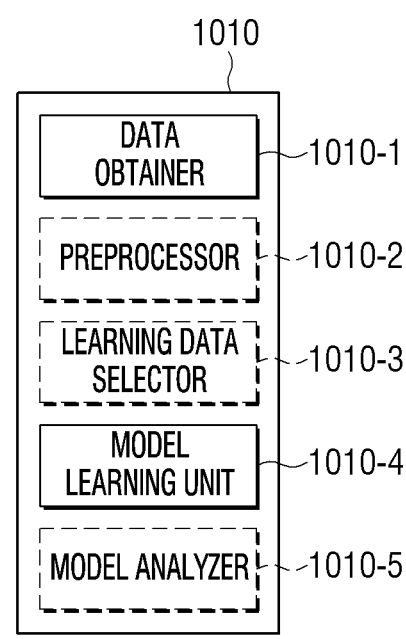

FIG. 11 is a block diagram of the data learning unit 1010 according to an embodiment of the disclosure.

Referring to FIG. 11, the data learning unit 1010 according to an embodiment may include a data obtainer 1010-1 and a model learning unit 1010-4. In addition, the data learning unit 1010 may further selectively include at least one of a preprocessor 1010-2, a learning data selector 1010-3, and a model analyzer 1010-5.

The data obtainer 1010-1 may obtain learning data required for learning to identify circumstance.

The learning data may be data which is collected or tested by the data learning unit 1010 or the manufacturer of the electronic apparatus 100. Alternatively, the learning data may include voice data generated from a natural language uttered by the user through the microphone according to an embodiment. Further, voice data generated from a user action related to the natural language uttered by the user through the camera may be included. The microphone and the camera may be provided within the electronic apparatus 100, but this is merely one embodiment, and voice data on the natural language and image data on action obtained through an external microphone and camera may be used as learning data. The model learning unit 1010-4 may use the learning data to train the data recognition model to have an identification criterion on how to identify a predetermined circumstance. For example, the model learning unit 1010-4 may train the data recognition model through supervised learning which uses at least a part of the learning data as an identification criterion. Alternatively, the model learning unit 1010-4 may, by learning on its own using the learning data without particular supervision, train the data recognition model through unsupervised learning in which an identification criterion is discovered for identifying circumstance.

In addition, the model learning unit 1010-4 may learn a selection criterion on which learning data is to be used to identify circumstance.

According to an embodiment, the model learning unit 1010-4 may generate or train the data recognition model by using the learning data related to voice information and the learning data related to image information. If the data recognition model is trained through the supervised learning method, as an identification criterion, a condition according to user intent and an action to be executed according to condition may be added as learning data. Alternatively, an event to be detected according to the condition and a function to be executed according to the action may be added as learning data. Alternatively, a detection resource to detect the event and an execution resource to execute the function may be added as learning data.

Alternatively, the model learning unit 1010-4 may use the learning data related to condition and the learning data related to action to generate and train the data recognition model.

If the data recognition model is trained through the supervised learning method, as an identification criterion, the event to be detected according to condition and the function to be executed according to the action may be added as learning data. Alternatively, the detection resource to detect the event and the execution resource to execute the function may be added as learning data.

Alternatively, the model learning unit 1010-4 may use the learning data related to the event and the learning data related to the function to generate and train the data recognition model.

If the data recognition model is trained through the supervised learning method, as an identification criterion, the detection resource to detect an event and an execution resource to execute the function may be added as a learning data.

The data recognition model may be pre-built, and may be a model which is updated through training of the model learning unit 1010-4. The data recognition model may be in a pre-built state by receiving input of basic learning data (e.g., sample image, etc.).

The data recognition model may be built considering the application field of the recognition model, the learning purpose, the computer performance of the apparatus, or the like. The data recognition model may, for example, be a model based on a neural network. The data recognition model may be designed to simulate the brain structure of a human on a computer. The data recognition model may include a plurality of weighted network nodes that may simulate the neurons of a human neural network. The plurality of network nodes may each establish a connection relationship so that the neurons simulate the synaptic activity of the neurons sending and receiving signals through the synapse. The data recognition model may, for example, include a neural network model or a deep learning model developed from the neural network model. The plurality of network nodes in the deep learning model may be placed at different depths (or, layers) from one another, and may transmit and receive data according to a convolution connection relationship.

For example, models such as a deep neural network (DNN), a recurrent neural network (RNN), and a bidirectional recurrent deep neural network (BRDNN) may be used as a data recognition model, but the embodiment is not limited thereto.

According to various embodiments, the model learning unit 1010-4 may, if the pre-built data recognition model is not present in plurality, determine the data recognition model with the highest relevance in input learning data and basis learning data as the data recognition model to be trained. The basic learning data may be pre-classified by data type, and the data recognition model may be pre-built by data type. For example, the basic learning data may be pre-classified to various criteria such as the area in which the learning data is generated, the time in which the learning data is generated, the size of the learning data, the genre of the learning data, the generator of the learning data, and the type of object within the learning data.

In addition, the model learning unit 1010-4 may, for example, train the data recognition model by using learning algorithm, and the like including an error back-propagation method or a gradient descent method.

In addition, the model learning unit 1010-4 may, for example, train the data recognition model through supervised learning by using the identified criterion as the input value. Alternatively, the model learning unit 1010-4 may, for example, by learning on its own using the necessary learning data without particular supervision, train the data recognition model through a non-supervised learning in which an identification criterion is discovered for identifying circumstance. In addition, the model learning unit 1010-4 may, for example, train the data recognition model through reinforcement learning in which a feedback on whether the result of circumstance identification according to training is correct or not is used.

In addition, if the data recognition model is trained, the model learning unit 1010-4 may store the trained data recognition model. In this case, the model learning unit 1010-4 may store the trained data recognition model in the memory 110 of the electronic apparatus 100. Alternatively, the model learning unit 1010-4 may store the trained data recognition model in the memory of a sever connected with the electronic apparatus 100 via wired or wireless network.

The data learning unit 1010 may improve the recognition result of the data recognition model, or may further include a preprocessor 1010-2 and a learning data selector 1010-3 to save resources or time required in generating the data recognition model.

The preprocessor 1010-2 may preprocess data obtained by the data obtainer 1010-1 to use in the training for circumstance identification.

In an example, the preprocessor 1010-2 may process the obtained data to a pre-defined format for the model learning unit 1010-4 using data for training the data recognition model to be convenient. For example, the preprocessor 1010-2 may process the voice data obtained by the data obtainer 1010-1 to text data, and may process the image data to an image data of a pre-set format. The preprocessed data may be provided to the model learning unit 1010-4 as a learning data.

Alternatively, the learning data selector 1010-3 may selectively select learning data required in training of the preprocessed data. The selected learning data may be provided to the model learning unit 1010-4. The learning data selector 1010-3 may, based on the pre-set selection criterion, select the learning data required in training of the preprocessed data. In addition, the learning data selector 1010-3 may also select the learning data required in training according to the pre-set identification criterion by the training to of the model learning unit 1010-4. According to an embodiment, the learning data selector 1010-3 may select only the voice data uttered by a specific user of the input voice data, and may select only the area included a person excluding the background of the image data.

The data learning unit 1010 may further include a model analyzer 1010-5 for improving the recognition result of the data recognition model.

The model analyzer 1010-5 may input analysis data to the data recognition model, and based on the recognition result output from the analysis data not satisfying a predetermined criterion, have the model learning unit 1010-4 to learn again. In this case, the analysis data may be pre-defined data for analyzing the data recognition model.

For example, the model analyzer 1010-5 may, from the recognition result of the trained data recognition model with respect to analysis data, if the number or percentage of analysis data of which the recognition result is not accurate exceeds a predetermined threshold value, analyze as not satisfying the predetermined criterion. For example, if the predetermined criterion is defined to a percentage of 2% and the trained data recognition model outputs an incorrect recognition result with respect to the analysis data that exceeds 20 of the 1000 analysis data, the model analyzer 1010-5 may analyze the trained data recognition model as not suitable.

If the trained data recognition model is present in plurality, the model analyzer 1010-5 may analyze whether a predetermined criterion is satisfied with respect to each of the trained data recognition model, and may determine the model which satisfies the predetermined criterion as the final data recognition model. Based on the model that satisfies the predetermined criterion being in plurality, the model analyzer 1010-5 may determine any one of pre-set model or a predetermined number of models as the final data recognition model in the order of the highest analysis score.

At least one of the above-described data obtainer 1010-1, the preprocessor 1010-2, the learning data selector 1010-3, the model learning unit 1010-4, and the model analyzer 1010-5 may be implemented as a software module or manufactured to at least one hardware chip form and mounted to the electronic apparatus. For example, at least one of the data obtainer 1010-1, the preprocessor 1010-2, the learning data selector 1010-3, the model learning unit 1010-4, and the model analyzer 1010-5 may be manufactured to a hardware chip form dedicated to artificial intelligence (AI), or as a part of a conventional general purpose processor (e.g., a CPU or an application processor) or a graphics-only processor (e.g., a GPU) and mounted on the various electronic devices described above.

In addition, the data obtainer 1010-1, the preprocessor 1010-2, the learning data selector 1010-3, the model learning unit 1010-4, and the model analyzer 1010-5 may be mounted to one electronic apparatus, or mounted to separate electronic apparatuses, respectively. For example, a part of the data obtainer 1010-1, the preprocessor 1010-2, the learning data selector 1010-3, the model learning unit 1010-4, and the model analyzer 1010-5 may be included in the electronic apparatus, and the remaining part may be included in the server.

In addition, at least one of the data obtainer 1010-1, the preprocessor 1010-2, the learning data selector 1010-3, the model learning unit 1010-4, and the model analyzer 1010-5 may be implemented as a software module. If at least one of the data obtainer 1010-1, the preprocessor 1010-2, the learning data selector 1010-3, the model learning unit 1010-4, and the model analyzer 1010-5 is implemented as a software module (or, a program module including an instruction), the software module may be stored in a non-transitory computer readable media. In addition, at least one software module may be provided by an operating system (OS), or by a predetermined application. Alternatively, a part of the at least one software module may be provided by the OS, and the remaining part may be provided by a predetermined application.

Figure 12:
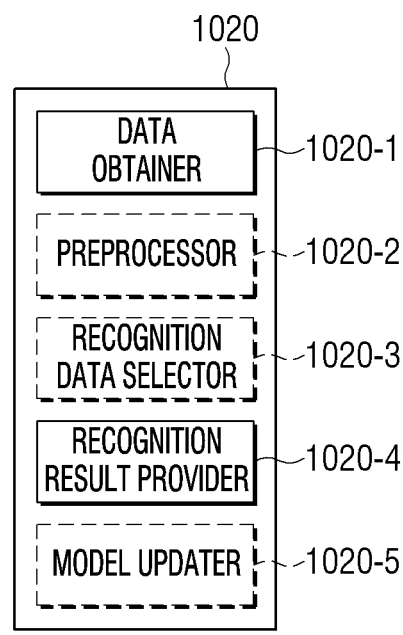

FIG. 12 is a block diagram of a data recognition unit 1020 according to some embodiments.

Referring to FIG. 12, the data recognition unit 1020 according to some embodiments may include a data obtainer 1020-1 and a recognition result provider 1020-4. In addition, the data recognition unit 1020 may selectively further include at least one of a preprocessor 1020-2, a recognition data selector 1020-3, and a model updater 1020-5.

The data obtainer 1020-1 may obtain recognition data required in identifying circumstance.

The recognition result provider 1020-4 may identify circumstance by applying data obtained from the data obtainer 1020-1 to the trained data recognition model as an input value. The recognition result provider 1020-4 may provide a recognition result according to the data recognition purpose. Alternatively, the recognition result provider 1020-4 may provide the obtained recognition result by applying the data preprocessed in the preprocessor 1020-2 which will be described below to the trained data recognition model as an input value. Alternatively, the recognition result provider 1020-4 may provide the recognition result by applying the data selected by the recognition data selector 1020-3 which will be described below to the data recognition model as an input value.

The data recognition unit 1210 may improve the recognition result of the data recognition model, or further include a preprocessor 1020-2 and a recognition data selector 1020-3 to save resources or time for providing recognition results.

The preprocessor 1020-2 may preprocess data obtained by the data obtainer 1020-1 to use in the recognition for identifying circumstance.

The preprocessor 1020-2 may process the obtained data to a pre-defined format for the recognition result provider 1020-4 using data for identifying circumstance to be convenient. According to an embodiment, the data obtainer 1020-1 may obtain voice data and image data for identifying circumstance (identification on condition and action, event according to condition, function according to action, detection resource to detect event, and the like), and the preprocessor 1020-2 may as described above preprocess to a pre-defined format.

The recognition data selector 1020-3 may select recognition data required in identifying circumstance of the preprocessed data. The selected recognition data may be provided to the recognition result provider 1020-4. The recognition data selector 1020-3 may, based on the pre-set selection criterion, select recognition data required in identifying circumstance of the preprocessed data. In addition, the recognition data selector 1020-3 may select data according to the selection criterion pre-set by training by the above-described model learning unit 1010-4.

The model updater 1020-5 may, based on an analysis on the recognition result provided by the recognition result provider 1020-4, may control the data recognition model to be updated. For example, the model updater 1020-5 may, by providing the recognition result provided by the recognition result provider 1020-4 to the model learning unit 1010-4, control the model learning unit 1010-4 to update the data recognition model.

The above described at least one of the data obtainer 1020-1, the preprocessor 1020-2, the recognition data selector 1020-3, the recognition result provider 1020-4, and the model updater 1020-5 within the data recognition unit 1020 may be implemented as a software module or manufactured to at least one hardware chip form and mounted to the electronic apparatus. For example, at least one of the data obtainer 1010-1, the preprocessor 1010-2, the learning data selector 1010-3, the model learning unit 1010-4, and the model analyzer 1010-5 may be manufactured to a hardware chip form dedicated to artificial intelligence (AI), or as a part of a conventional general purpose processor (e.g., a CPU or an application processor) or a graphics-only processor (e.g., a GPU) and mounted on the various electronic devices described above.

In addition, the data obtainer 1020-1, the preprocessor 1020-2, the recognition data selector 1020-3, the recognition result provider 1020-4, and the model updater 1020-5 may be mounted on one electronic apparatus, or may be mounted on separate electronic apparatuses, respectively. For example, a part of the data obtainer 1020-1, the preprocessor 1020-2, the recognition data selector 1020-3, the recognition result provider 1020-4, and the model updater 1020-5 may be included in the electronic device 100, and the remaining part may be included in the external server 200.

In addition, at least one of the data obtainer 1020-1, the preprocessor 1020-2, the recognition data selector 1020-3, the recognition result provider 1020-4, and the model updater 1020-5 may be implemented as a software module. If at least one of the data obtainer 1020-1, the preprocessor 1020-2, the recognition data selector 1020-3, the recognition result provider 1020-4, and the model updater 1020-5 is implemented as a software module (or, a program module including an instruction), the software module may be stored in a non-transitory computer readable media. In addition, at least one software module may be provided by an operating system (OS), or by a predetermined application. Alternatively, a part of the at least one software module may be provided by the OS, and the remaining part may be provided by a predetermined application.

Figure 13:
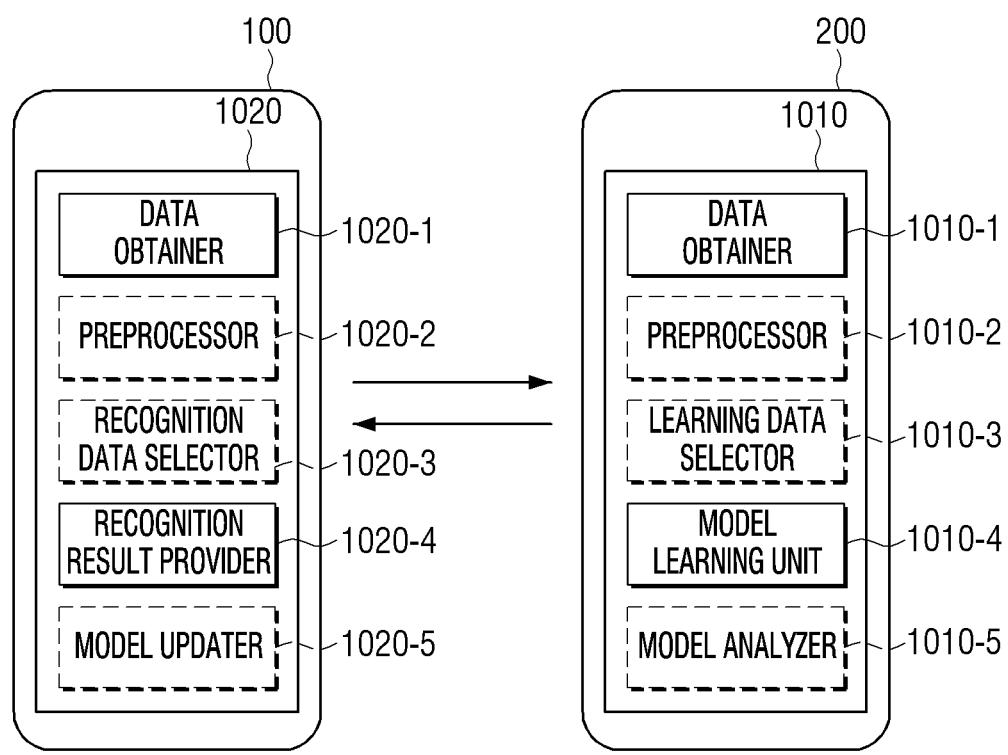

FIG. 13 is a diagram illustrating an example of an electronic apparatus 100 and an external server 200 learning and recognizing data by interconnecting according to some embodiments.

Referring to FIG. 13, the external server 200 may learn the criterion for identifying circumstance, and the electronic apparatus 100 may identify circumstance based on the learning result by the external server 200.

The model learning unit 1010-4 of the external server 200 may learn the criterion on what data to use for identifying a predetermined circumstance, and how to identify circumstance using the data. The model learning unit 1010-4 may obtaining data to be used in the learning and applying the obtained data to the data recognition model to be described below, may learn the criterion for identifying circumstance.

In addition, the recognition result provider 1020-4 of the electronic apparatus 100 may identify the circumstance by applying the data selected by the recognition data selector 1020-3 to the data recognition model generated by the external server 200. Specifically, the recognition result provider 1020-4 may transmit the data selected by the recognition data selector 1020-3 to the external server 200, and the external sever 200 may request that the circumstance may be identified by applying the data selected by the recognition data selector 1020-3 to the recognition model. In addition, the recognition result provider 1020-4 may receive information on the circumstance identified by the external server 200 from the external server 200. For example, if the voice data and the image data is transmitted to the external server 200 by the recognition data selector 1020-3, the external server 200 may apply the voice data and the image data to the pre-stored data recognition model and transmit the information on the circumstance (e.g., condition and action, event according to condition, function according to action, etc.) to the electronic apparatus 100.

Alternatively, the recognition result provider 1020-4 of the electronic apparatus 100 may receive a recognition model generated by the external server 200 from the external server 200, and identify circumstance by using the received recognition model. The recognition result provider 1020-4 of the electronic apparatus 100 may identify the circumstance by applying data selected by the recognition data selector 1020-3 to the data recognition model received from the external server 200. For example, the electronic apparatus 100 may receive the data recognition model from the external server 200 and store the data recognition model, and identify the information on the circumstance (e.g., condition and action, event according to condition, function according to action, etc.) by applying the voice data and the image data selected by the recognition data selector 1020-3 to the data recognition model received from the external server 200.

Figure 14A:
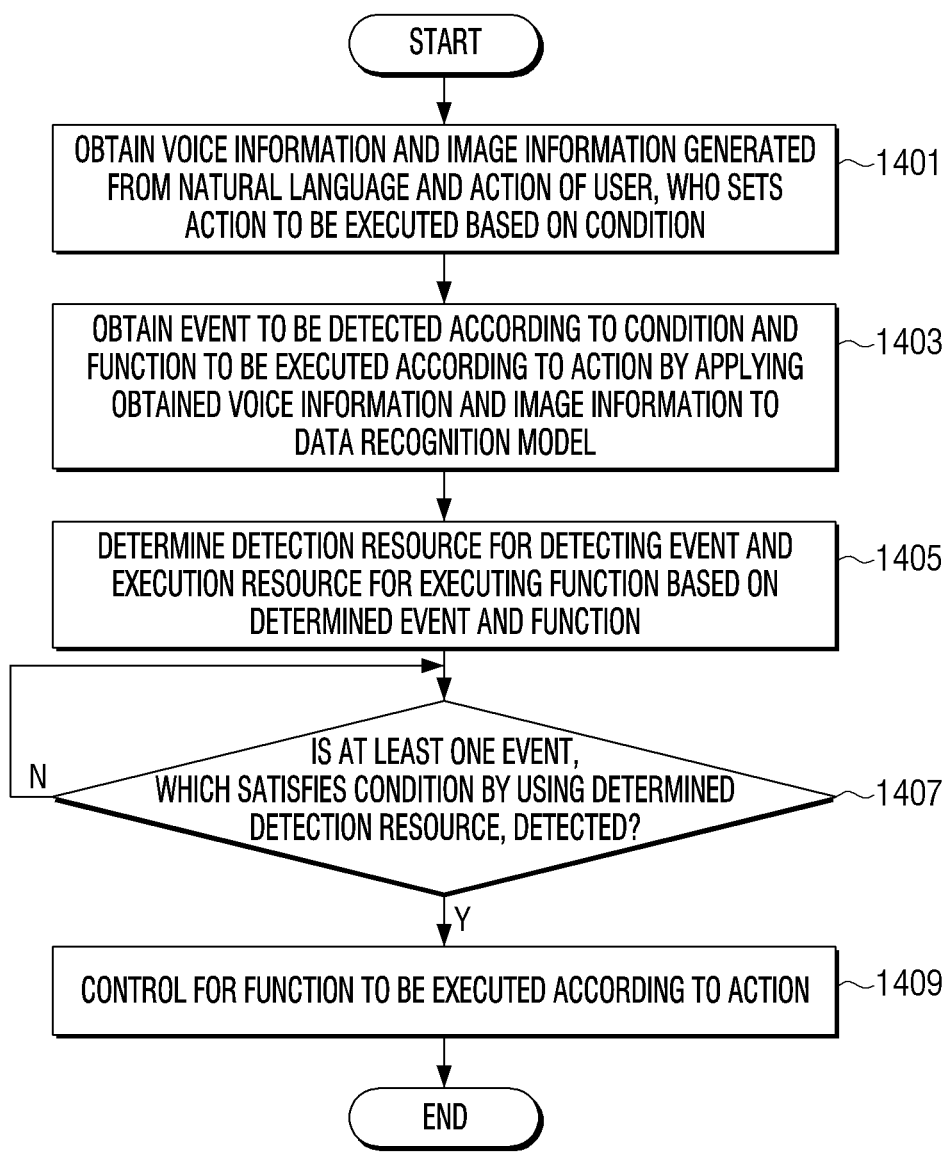
FIGS. 14A to 14C are flowcharts illustrating an electronic apparatus using a data recognition model according to an embodiment of the disclosure.
Figure 14B:
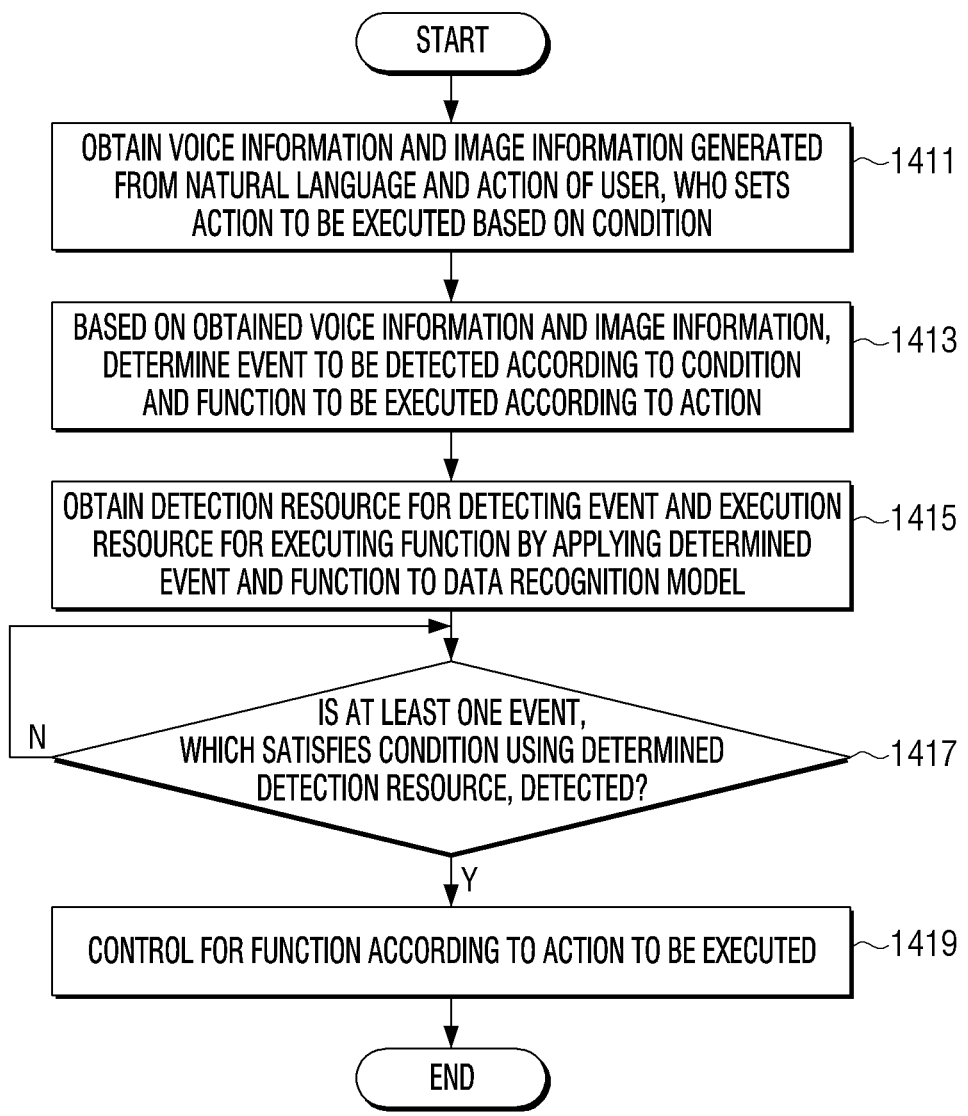
Figure 14C:
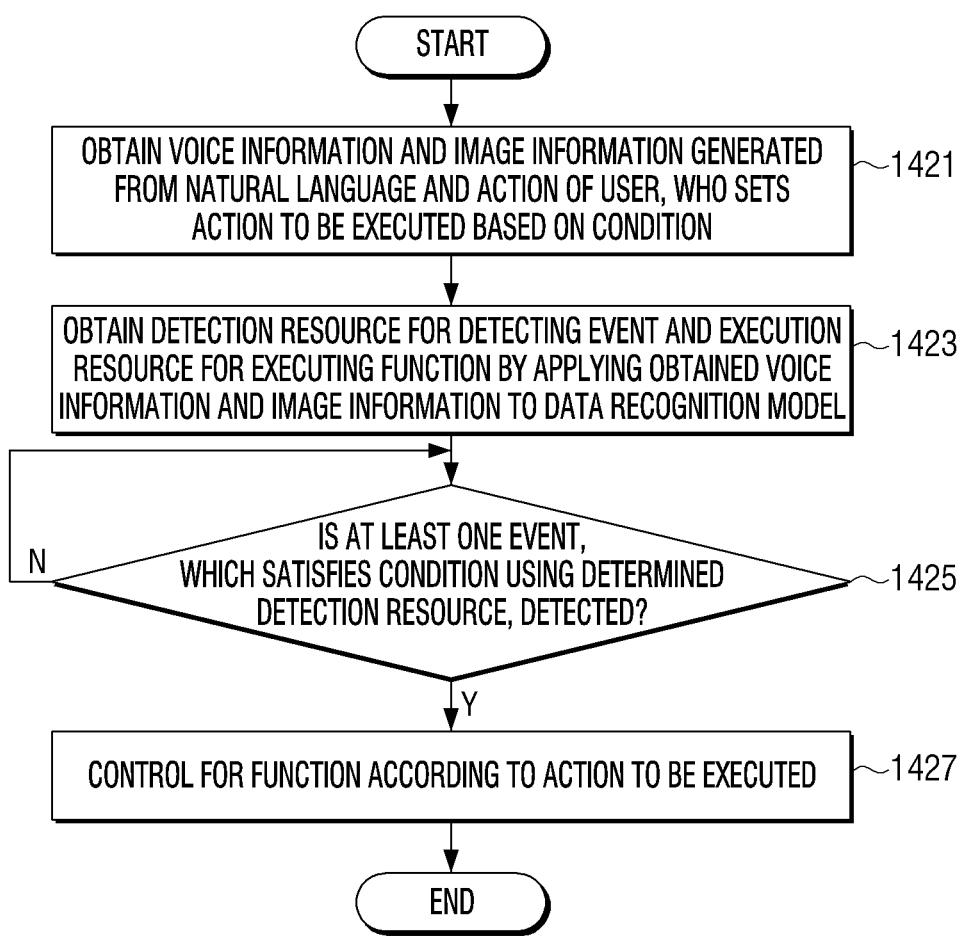

FIGS. 14A to 14C are flowcharts illustrating an electronic apparatus 100 using a data recognition model according to an embodiment of the disclosure.

First, in operation 1401 of FIG. 14A, the electronic apparatus 100 may obtain voice information and image information generated from the natural language and action of the user setting an action to be executed according to the condition.

In operation 1403, the electronic apparatus 100 may apply the obtained voice information and the image information to the trained data recognition model, and obtain an event to be detected according to condition and a function to be executed according to action.

Next, in operation 1405, the electronic apparatus 100 may, based on the determined event and function, determine a detection resource to detect an event and an execution resource to execute a function.

Based on the detection resource and the execution resource being determined, in operation 1407, the electronic apparatus 100 may use the determined detection resource to identify whether at least one event satisfying the condition is detected.

If at least one event is detected 1407-Y, in operation 1409, the electronic apparatus 100 may control for a function according to action to be executed.

According to another embodiment, in operation 1411 of FIG. 14B, the electronic apparatus 100 may obtain voice information and image information generated from the natural language and action of the user setting the action to be executed according to condition.

In operation 1413, the electronic apparatus 100 may, based on the obtained voice information and the image information, determine an event to be detected according to condition and a function to be executed according to action.

Next, in operation 1415, the electronic apparatus 100 may apply the determined event and function to the data recognition model, and obtain a detection resource to detect event and an execution resource to execute function.

In operations 1417 to 1419 below, the electronic apparatus 100 may, based on at least one event satisfying the condition being detected, control so that the function according to action may be executed.

According to another embodiment, in operation 1421 of FIG. 14C, the electronic apparatus 100 may obtain the voice information and the image information generated from the natural language and action of the user, setting the action to be executed according to condition.

In operation 1423, the electronic apparatus 100 may apply the obtained voice information and the image information to the data recognition model, and obtain a detection resource to detect an event and an execution resource to execute a function.

Based on the detection resource and the execution resource being determined, in operation 1425, the electronic apparatus 100 may use the determined detection resource and identify whether at least one event satisfying the condition is detected.

If at least one event is detected 1425-Y, in operation 1427, the electronic apparatus 100 may control for the function according to action to be executed.

Figure 15A:
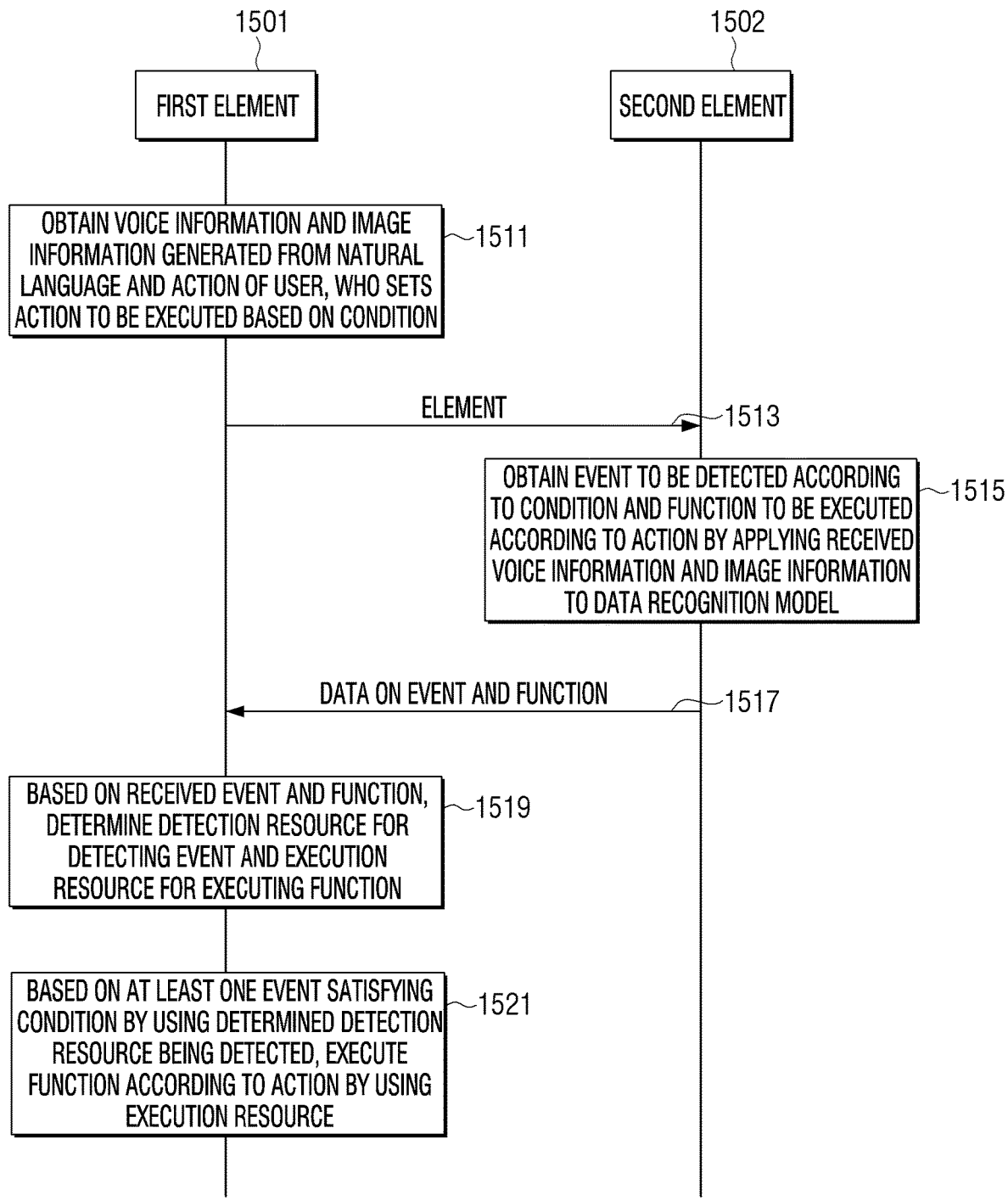
FIGS. 15A and 15B are flowcharts illustrating a network system using a data recognition model according to an embodiment of the disclosure.
Figure 15B:
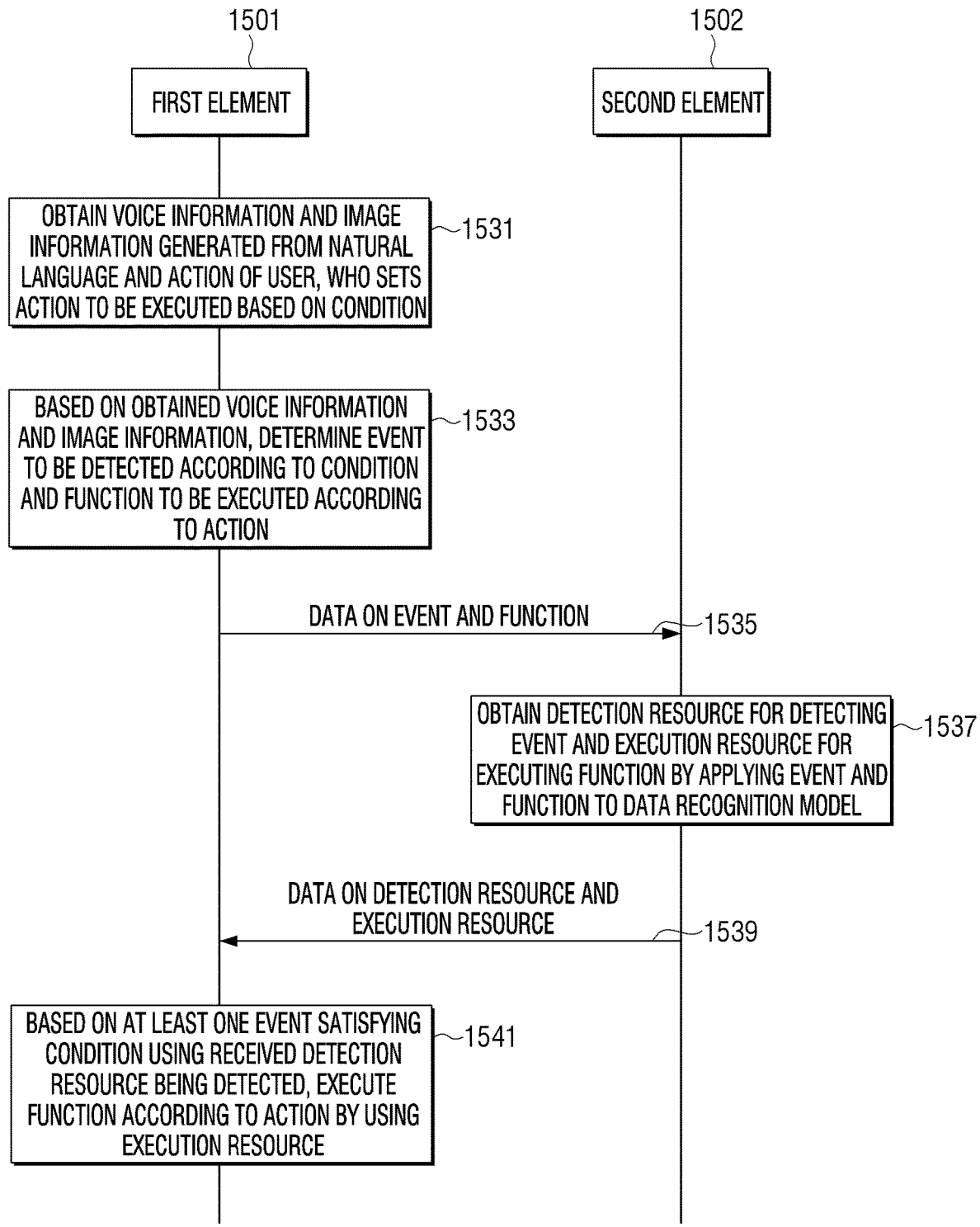

FIGS. 15A and 15B are flowcharts illustrating a network system using a data recognition model according to an embodiment of the disclosure.

In FIGS. 15A to 15B, the network system using the data recognition model may include a first element 1501 and a second element 1502.

In an example, the first element 1501 may be the electronic apparatus 100, and the second element 1502 may be the external server 200 stored in the data recognition model. Alternatively, the first element 1501 may be a generic-purpose processor, and the second element 1502 may be an AI-dedicated processor. Alternatively, the first element 1501 may be at least one application, and the second element 1502 may be the operation system (OS). That is, the second element 1502 may be more integrated, dedicated, lesser delays, or superior in performance than the first element 1501, or as an element of many resources may be an element capable of processing the numerous calculations required in the generating, updating, or applying of the data recognition model more quickly and effectively than the first element 1501.

An interface for transmitting and receiving data between the first element 1501 and the second element 1502 may be defined.

For example, the learning data to be applied to the data recognition model may be defined as an application program interface (API) with a factor value (or, a parameter value or transfer value). The API may be defined as a set of sub routines or functions capable of being called for a certain processing of another protocol (e.g., protocol defined in the external server 200) from any one protocol (e.g., protocol defined in the electronic apparatus 100). That is, an environment in which operation of another protocol from any one protocol may be performed through the API may be provided.

According to an embodiment, in operation 1511 of FIG. 15A, the first element 1501 may obtain the voice information and the image information generated from the natural language and action of the user setting the action to be executed according to the condition.

In operation 1513, the first element 1501 may transmit the data (or, message) related to the obtained voice information and the image information to the second element 1502. For example, if the first element 1501 calls the API function and inputs the voice information and the image information as a data factor value, the API function may transfer the voice information and the image information to the second element 1502 as recognition data to be applied to the data recognition model.

In operation 1515, the second element 1502 may apply the received voice information and the image information to the data recognition model and obtain an event to be detected according to condition and a function to be executed according to action.

In operation 1517, the second element 1502 may transfer the obtained event and data (or, message) related to function to the first element 1501.

In operation 1519, the first element 1501 may, based on the received event and function, determine the detection resource to detect event and the execution resource to execute function.

In operation 1521, the first element 1501 may, based on at least one event that satisfies the condition by using the determined detection resource being detected, execute the function according to action by using the determined execution resource.

In an another embodiment, in operation 1531 of FIG. 15B, the first element 1501 may obtain voice information and image information generated from the natural language and action of the user setting the action to the executed according to condition.

In operation 1533, the first element may, based on the obtained voice information and the image information, determine an event to be detected according to condition and a function to be executed according to action.

In operation 1535, the first element 1501 may transmit data (or, message) related to the determined event and function to the second element 1502. For example, if the first element 1501 calls the API function and inputs the event and function as a data factor value, the API function may transfer the event and function to the second element 1502 as recognition data to be applied in the data recognition model.

In operation 1537, the second element 1502 may apply the received event and function to the data recognition model, and obtain the detection resource to detect the event and the execution resource to execute the function.

In operation 1539, the second element 1502 may transmit the data (or, message) related to the obtained detection resource and the execution resource to the first element 1501.

In operation 1541, the first element 1501 may, based on at least one event satisfying the condition by using the received detection resource being detected, use the received execution resource and execute a function according to action.

Although all elements comprising an embodiment of the disclosure has been described as being combined to one or combined and operated, the embodiment is not necessarily limited thereto. That is, the all elements may be selectively combined to one or more and operated so long as it is within the intended scope of the disclosure. In addition, each of the all elements may be implemented to one independent hardware, or a part or all of the each elements may be selectively combined to be implemented as computer program with program modules performing a part or all functions combined in the one or plurality of hardware.

At least a portion of the apparatus (e.g., modules or functions thereof) or method (e.g., operations) according to the various embodiments may be in the form of a program module and may be implemented as an instruction stored in non-transitory computer readable media. If the instruction is performed by a processor (e.g., processor 120), the processor may perform the function corresponding to the instruction.

Since the program may be stored in the computer readable non-transitory recordable medium to be read and executed by a computer, the embodiment of the disclosure may be realized.

The non-transitory readable recording medium may not only refer to a machine-readable medium which stores data semi-permanently, but also includes a register, a cache, a buffer, and the like, and may not include a transmission medium such as a signal, a current, and the like.

The above-described programs may be stored and provided in a non-transitory readable recording media such as a compact disc (CD), a digital versatile disc (DVD), a hard disc, a Blu-ray disc, a universal serial bus (USB), an embedded memory (e.g., memory 110), a memory card, and a ROM or RAM.

In addition, the method according to the embodiments described above may be provided as a computer program product.

The computer program product may include a software program, a computer readable recordable medium stored with the software program, or a commodity exchanged between a seller and a purchaser.

For example, the computer program product may include a product (e.g., a downloadable application) in the form of a software program distributed through an electronic apparatus, a manufacturer of the electronic apparatus, or an electronic market (e.g., Google PlayStore™, application store, etc.). For an electronic distribution, at least a portion of the software program may be stored in a storage medium or temporarily generated. In this case, the storage medium may be the storage medium a server of a manufacturer, a server in an application store, or a storage medium in a relay server.

While various embodiments have been illustrated and described with reference to certain drawings, the disclosure is not limited to the example embodiments or the drawings, and it will be understood by those of ordinary skill in the art that various changes in form and details may be made therein without departing from the spirit and scope as defined, for example, by the following claims and their equivalents.

What is claimed is:

1. A non-transitory computer-readable medium storing instructions, which when executed by at least one processor cause the at least one processor to perform the following steps of controlling an electronic apparatus for analyzing a voice by using an artificial intelligence learning model:

receiving input of voice, and obtaining information on the voice;

identifying whether a voice model data pattern matching the information on the voice is present in a database comprising a plurality of voice model data patterns corresponding to a plurality of categories, wherein the voice model data pattern comprises a mechanical sound determination model, a gender classification model, an age classification model, and a language classification model;

based on the voice model data pattern matching the information on the voice being present in the database, identifying category information of the voice as category information corresponding to the voice model data pattern;

determining at least one operation mode corresponding to the category information based on at least one of obtained output information by inputting the voice to a plurality of artificial intelligence models corresponding to a plurality of operation modes or setting information obtained by a user along with the identified category information;

based on the voice model data pattern matching the information on the voice not being present in the database, identifying the category information as an uncategorized category and determining the operation mode to be a pre-set basic mode;

based on the determined operation mode being a voice phishing prevention mode, obtaining content, in which the voice is textualized, and a voice feature information from the voice, wherein the feature information comprises a shaking of the voice, tone, or number of phonemes per unit time;

obtaining a control instruction by inputting the content and the feature information to the artificial intelligence model corresponding to the voice phishing prevention mode;

performing at least one function of the voice phishing prevention mode based on the control instruction, wherein a function voice phishing prevention mode comprises displaying a report button, limiting financial applications, or a voice phishing alarm;

based on the basic mode being an automatic mode, inputting the voice to the plurality of artificial intelligence models corresponding to the plurality of operation modes and determining an operation mode corresponding to an output information based on the output information; and determining a category information corresponding to the operation mode, and updating a voice model data pattern corresponding to the category information based on information on the voice.

2. The non-transitory computer-readable medium of claim 1, wherein the category information comprises a voice phishing category, an advertisement category, a family category, or an acquaintance category, and wherein the determined operation mode comprises a voice phishing prevention mode, an advertisement filter mode, a conversation analysis mode, a speech practice mode, an English call mode, or an automatic mode.

3. The non-transitory computer-readable medium of claim 1, further comprising:

based on the determined operation mode being a conversation analysis mode, applying the voice to the artificial intelligence model corresponding to the determined operation mode and obtaining at least one information of a keyword information or an emotion information on the voice; and outputting the obtained information through a function of the conversation analysis mode based on a pre-set event occurring, wherein a function of the conversation analysis mode comprises displaying frequency of interest keyword comprised within a pre-set period, providing information link related to a keyword, or displaying frequency of negative conversations within a pre-set period.

4. The non-transitory computer-readable medium of claim 3, wherein the function of the conversation analysis mode further comprises providing a guide to correct negative conversations.

5. The non-transitory computer-readable medium of claim 1, further comprising:

based on the determined operation mode being a speech practice mode, applying the voice to the artificial intelligence model corresponding to the determined operation mode and obtaining at least one information of a grammar information, a pronunciation information, or an intonation information on the voice; and outputting the obtained information through a function of the speech practice mode based on a pre-set event occurring, wherein a function of the speech practice mode comprises displaying frequency of pronunciation error within a pre-set period, and displaying a grammatical error within a pre-set period.

6. The non-transitory computer-readable medium of claim 1, further comprising identifying whether the voice is registered on a black list on the voice phishing prevention mode.

7. An electronic apparatus for analyzing a voice by using an artificial intelligence learning model, the electronic apparatus comprising:

a communicator;
a voice receiver;
a voice main part obtainer; and
a processor, wherein the processor is configured to:

control the voice receiver to receive input of voice, control the voice main part obtainer to obtain information on the received voice, identify whether a voice model data pattern matching the information on the received voice is present in a database comprising a plurality of voice model data patterns corresponding to a plurality of categories, wherein the voice model data pattern comprises a mechanical sound determination model, a gender classification model, an age classification model, and a language classification model, based on the voice model data pattern matching the information on the voice being present in the database, identify category information on the received voice as category information corresponding to the voice model data pattern, determine at least one operation mode corresponding to the category information based on at least one of obtained output information by inputting the voice to a plurality of artificial intelligence models corresponding to a plurality of operation modes or setting information obtained by a user along with the identified category information, based on the voice model data pattern matching the information on the voice not being present in the database, identify the category information as an uncategorized category and determine the operation mode to be a pre-set basic mode, based on the determined operation mode being a voice phishing prevention mode, obtain content, in which the voice is textualized, and a voice feature information from the voice, wherein the feature information comprises a shaking of the voice, tone, or number of phonemes per unit time, control the communicator to receive an output control instruction from an external server by inputting the content and the feature information to the artificial intelligence model corresponding to the voice phishing prevention mode, perform at least one function of the voice phishing prevention mode based on the control instruction, wherein a function voice phishing prevention mode comprises displaying a report button, limiting financial applications, or a voice phishing alarm, based on the basic mode being an automatic mode, input the voice to the plurality of artificial intelligence models corresponding to the plurality of operation modes and determine an operation mode corresponding to an output information based on the output information, and determine a category information corresponding to the operation mode, and update a voice model data pattern corresponding to the category information based on information on the voice.

8. The electronic apparatus of claim 7, wherein the category information comprises a voice phishing category, an advertisement category, a family category, or an acquaintance category, and wherein the determined operation mode comprises a voice phishing prevention mode, an advertisement filter mode, a conversation analysis mode, a speech practice mode, an English call mode, or an automatic mode.

9. The electronic apparatus of claim 7, further comprising:
a communicator,
wherein the processor is further configured to:
  control the communicator to receive at least one information of a keyword information or an emotion information on the voice output from the artificial intelligence model corresponding to the determined operation mode, and
  output the received information through a function of a conversation analysis mode based on a pre-set event occurring, and
wherein a function of the conversation analysis mode comprises displaying frequency of interest keyword comprised within a pre-set period, providing information link related to a keyword, or displaying frequency of negative conversations within a pre-set period.

10. The electronic apparatus of claim 7, further comprising:
a voice text converter;
a voice feature obtainer; and
a communicator,
wherein the processor is further configured to:
  control the voice text converter to obtain content in which the voice is textualized,
  control the voice feature obtainer to obtain a voice feature information from the voice, and
  control the communicator to receive an output control instruction from an external server by inputting the content and the feature information to the artificial intelligence model corresponding to the determined operation mode, and
wherein the feature information comprises a shaking of the voice, tone, or number of phonemes per unit time.

11. The electronic apparatus of claim 7, further comprising:
a communicator,
wherein the processor is further configured to:
  based on the determined operation mode being a speech practice mode, control the communicator to receive at least one information of a grammar information, a pronunciation information, and an intonation information on the voice from an external server by inputting the voice to the artificial intelligence model corresponding to the determined operation mode, and
  output the received information through a function of the speech practice mode based on a pre-set event occurring, and
wherein a function of the speech practice mode comprises displaying frequency of pronunciation error within a pre-set period, or displaying a grammatical error within a pre-set period.

* * * * *